US007016083B2

(12) United States Patent
Kotaka

(10) Patent No.: US 7,016,083 B2
(45) Date of Patent: Mar. 21, 2006

(54) COPYING MACHINE, COPYING-OPERATION CONTROL DEVICE AND COMPUTER READABLE RECORDING MEDIUM

(75) Inventor: Satoshi Kotaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 930 days.

(21) Appl. No.: 09/893,342

(22) Filed: Jun. 28, 2001

(65) Prior Publication Data

US 2002/0030827 A1  Mar. 14, 2002

(30) Foreign Application Priority Data

Jun. 29, 2000  (JP)  ............................. 2000-195506
Apr. 4, 2001   (JP)  ............................. 2001-105525

(51) Int. Cl.
*H04N 1/21* (2006.01)
*H04N 1/23* (2006.01)

(52) U.S. Cl. .................. 358/296; 358/1.13; 358/1.14; 358/1.15; 399/38; 399/75; 399/76; 399/361; 355/40

(58) Field of Classification Search ............ 399/361, 399/75, 38; 358/1.15, 296, 1.13, 1.14, 1.16; 355/40

See application file for complete search history.

(56) References Cited

U.S. PATENT DOCUMENTS

| 5,046,166 A | 9/1991 | Takayanagi |
| 5,055,935 A | 10/1991 | Ohno |
| 5,299,296 A | 3/1994 | Padalino et al. |
| 5,539,445 A * | 7/1996 | Muramatsu et al. ........ 347/262 |
| 5,880,851 A * | 3/1999 | Imada ........................ 358/296 |
| 6,014,528 A | 1/2000 | Natsume et al. |

FOREIGN PATENT DOCUMENTS

| JP | 62-166369 | 7/1987 |
| JP | 8-18706 | 1/1996 |
| JP | 8-55228 | 2/1996 |
| JP | 2820262 | 8/1998 |
| JP | 11-3004 | 1/1999 |
| JP | 11-69108 | 3/1999 |
| JP | 2901688 | 3/1999 |
| JP | 2000-22872 | 1/2000 |

OTHER PUBLICATIONS

Patent Abstracts of Japan 62-166369 Jul. 22, 1987.
Abstract 2820262 Aug. 28, 1998.
Abstract 2901688 Mar. 19, 1999.
Japanese Abstract, 8-55228, Feb. 27, 1996.
Patent Abstracts of Japan 62-166369 Jul. 22, 1987.
Abstract 2820262 Aug. 28, 1998.
Abstract 2901688 Mar. 19, 1999.
Japanese Abstract, 8-55228, Feb. 27, 1996.

* cited by examiner

*Primary Examiner*—Edward Coles
*Assistant Examiner*—Yixing Qin
(74) *Attorney, Agent, or Firm*—Sughrue Mion, PLLC

(57) ABSTRACT

There is disclosed a copying machine in which, to end a copy job, a reading-operation control process for causing a reading section to generate image data on an original document to be copied and a printing section control process for causing a printing section to print (output the copying result) in accordance with the image data are independently and concurrently carried out (time period t0 to t1, t2 to t4, t5 to t6). When the reading unit is not in reading operation (after time t2, and after time t5), the machine accepts a start command of a copy job.

6 Claims, 15 Drawing Sheets

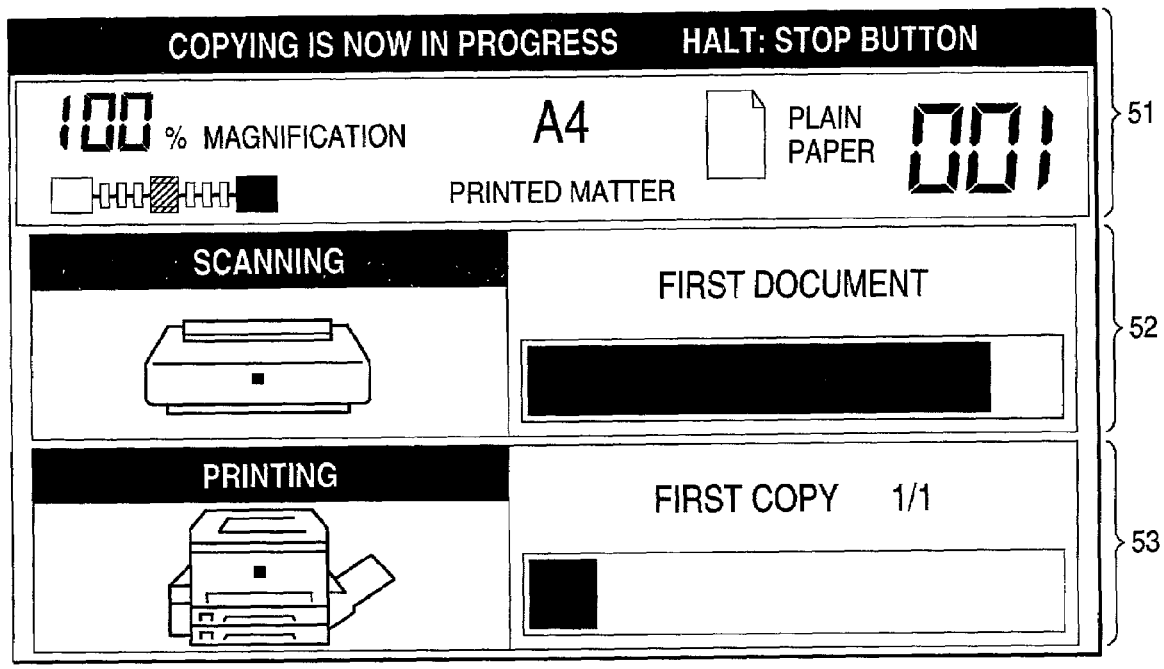

| |
|---|
| COPY JOB ID |
| FORWARD POINTER |
| BACKWARD POINTER |
| COPYING CONDITION INFORMATION |
| COPY-JOB STATUS INFORMATION |
| READING SECTION IDENTIFIER |
| READING SECTION STATUS INFORMATION |
| READING SECTION READING PROGRESS INFORMATION |
| PRINTING SECTION IDENTIFIER |
| PRINTING SECTION STATUS INFORMATION |
| PRINTING SECTION PRINTING PROGRESS INFORMATION |
| PRINTING SECTION JOB ID |
| STORAGE IMAGE DATA MANAGEMENR INFORMATION |

COPYING MACHINE, COPYING-OPERATION CONTROL DEVICE AND COMPUTER READABLE RECORDING MEDIUM

BACKGROUND OF THE INVENTION

1. Field of the Invention

The present invention relates to a copying machine for generating copies of an image on an original document, a copying-operation control device for controlling operations of a scanner and a printer for a copying operation, and a computer readable recording medium for operating a computer as such a copying-operation control device.

2. Related Art

Some types of copying machines allow a user to designate copying conditions (e.g., density and magnifying power) for the next copying work when the copying machine performs a copying operation. Those types of copying machines are disclosed in JP-A-62-166369, JP-B-2820262, JP-B-2901688 and others.

Those copying machines are of the analog type in which an image on an original document located on a document table is directly imaged on a photosensitive drum, and the formed image is developed onto a copy sheet by electro-photography technique. A recent general copying machine is made up of a reading section for generating image data representative of an image on an original document, a printing section for printing a picture representative of the image data, and a control section having copying conditions accepting function for accepting a designation of copying conditions and control function for controlling the reading section and the printing section in an integrating manner and causing the printing section to generate copies of the document image.

In this type of copying machine (referred to as a digital copying machine), the process executed by the mechanical system in the analog copying machine is allotted to the control section, and electronically executed.

Specifically, the control section of the digital copying machine executes a procedural process as shown in FIG. 18 when a copy start is instructed (when a copy start button is depressed). The procedural process illustrated in the figure is executed when the copying machine with an automatic document feeder generates one copy of a document image under control of its control section.

Namely, the control section instructs the reading section to read an image on a first original document (step S300). When the printing section can accept a predetermined amount of data (step S301; YES), the control section judges whether storage image data (to be described in detail later) is stored (retained) (step S302). If the storage image data is not stored (step S302; NO), the control section transfers a predetermined amount of image data (usually image data of several lines) from the reading section to the printing section (step SS303). Thereafter, the control section judges whether the reading process of the original document is completed (step S306), and if the reading process is not completed (step S306; NO), the control section executes the process that starts from the step S301.

The procedural steps mentioned above is progressively and repeatedly executed, and the printing section is put in a state that it cannot accept the data (step S301; NO), the control section obtains a predetermined amount of the image data from the reading section, and stores it as storage image data into an internal memory (step S305). Then, the control section judges whether the reading process of the document image is completed in the step S306.

When the control section recognizes that the storage image data is present in the internal memory (step S302; YES) and the printing section can accept the data (step S301; YES), the control section supplies a predetermined amount of the storage image data (which was earliest stored) to the printing section, and abandons the storage image data (makes free the memory area storing the storage image data having been supplied) (step S304). Then, the control section obtains the image data from the reading section and stores it (step S305), and executes (judges) a process of a step S306.

The control section progressively operates according to the procedural steps mentioned above, and when the reading process of the document image is completed (step S306; YES), the control section judges whether the storage image data is present (step S307). The control section judges whether the supplying of one sheet of the image data to the printing section is completed on the basis of the result of the judgment of whether the storage image data is present.

When the storage image data is present (step S307; YES) the control section waits till the printing section becomes ready for accepting the predetermined amount of data. When the printing section becomes ready for accepting the data (step S308; YES), the control section supplies the predetermined amount of the image data to the printing section and abandons the data (step S309), and the control section returns to the step S307.

The control section gets out of a loop consisting of steps S307 to S309 when the storage image data is used up (step S307; NO), and judges whether the next document is present (step S310). At a stage that the document reading operation ends (step S306; YES), if the storage image data is not present (step S307; NO), the control section executes the step S301 to judge whether the next document is present without executing the step S308 and the other.

If the next document is present (step S310; YES), the control section instructs the reading section to read an image on the next original document (step S311), and then executes again the process starting from the step S301. If the document to be copied runs out (step S310; YES), the control section ends the illustrated process.

As described above, the related digital copying machine repeats the execution of the process every document, as the analog copying machine does so.

Accordingly, in the related digital copying machine, even if it is of such a type that copying conditions maybe set during the execution of a copying process, when the machine is executing a copying process on a document, it is impossible to start a copying process on another document. The reason for this is that the related copying machine, in which the execution of a copying process progresses, rejects the setting of another document thereto (or does not start the reading of the document set) till the current copying process execution ends.

SUMMARY OF THE INVENTION

Accordingly, a first object of the present invention is to provide a copying machine in which a waiting time for a user to wait till a copying process being executed in response to an instruction by another user or the user himself ends, is shorter than in the related copying machine.

A second object of the present invention is to provide a copying-operation control device which operates as the copying machine of the first object when it is combined with a scanner and a printer.

A third object of the present invention is to provide a computer readable recording medium whose contents enables a computer to operate as the copying-operation control device of the second object.

To achieve the above objects, there is provided a copying machine comprising:

a reading unit which reads an image on an original document and outputs image data representing the image;

a printing unit which receives printing data and prints according to the printing data;

a data storing unit which stores the image data output from the reading unit;

a start-command accepting unit which accepts a start command for starting a copy job when the reading unit is not in a reading operation;

a reading-operation control unit which executes such controls that when the start-command accepting unit accepts the start-command of the copy job, the reading-operation control unit causes the reading unit to start the reading operation of reading the image on the original document set to the reading unit and the reading-operation control unit stores the image data output from the reading unit into the data storing unit whether the printing unit is operating or not; and a printing-operation control unit which supplies the printing data based on the image data stored in the data storing unit to the printing unit.

Thus, in the copying machine of the present invention, to end a copy job, a process to generate image data from an original document and a process to cause a printing section to print (output the copying result) in accordance with the image data are independently and concurrently carried out. When the reading unit is not in reading operation, the machine accepts a start command of a copy job. When the reading unit and the printing unit are constituted by a general hardware, the reading unit completes its operation earlier than the printing unit. Accordingly, in a copying machine using the printing unit and the reading unit which are designed in general structure, an original document to next be copied may be set to the machine and a start command of a copy job may be issued (for example, a start button may be pushed) before the printing unit outputs the printing result of one printing sheet (or a plurality of printing sheets). Accordingly, where the copying machine thus constructed is used, a time for a user to wait till a copying process being executed in response to an instruction by another user or the user himself ends, is shorter than in the conventional copying machine.

The copying machine may be realized by additionally including:

a managing unit which assigns copy job identifying information to each copy job of which a start command is obtained by the start-command accepting unit, and manages the correspondence between the image data stored in the data storing unit by the reading-operation control unit and the copy job identified by any of the copy job identifying information;

a halting-command accepting unit which accepts a halt command for halting the copy job; and a copy-job halting control unit which executes such controls that the copy-job halting control unit deletes from the data storing unit the image data which is managed by the managing unit and corresponds to the copy job identifying information of the copy job of which the halt command is accepted by the halting-command accepting unit, when the reading-operation control unit carries out a process on the copy job, the copy-job halting control unit causes the reading-operation control unit to halt the execution of the process, and when the printing-operation control unit executes a process on the copy job, the copy-job halting control unit causes the printing-operation control unit to halt the execution of the process.

In the copying machine of the invention, the image data generation and the image data printing are independently carried out. Accordingly, there is a chance that some copy jobs being not yet completed in execution are present. Use of the copying machine arranged as last mentioned is preferable in order to designate a copy job to be halted in execution in such a case.

The copying machine may also be realized by additionally including:

a display; and a display control unit which executes such controls that the display control unit causes the display to display a state of the process executed by the reading unit and a state of the process executed by the printing unit during the operation of the reading-operation control unit and the printing-operation control unit, and the display control unit causes the display to display a state that the start-command accepting unit can accept the start command of the copy job and the state of the process executed by the printing unit when the reading-operation control unit is not in operation and the printing-operation control unit is in operation.

A copying-operation control device connectable to a scanner and a printer of the present invention comprises:

a data storing unit which stores image data output from the scanner;

a start-command accepting unit which accepts a start command for starting a copy job when the scanner is not in a reading operation;

a reading-operation control unit which executes such controls that when the start-command accepting unit accepts the start-command, the reading-operation control unit causes the scanner to start the reading operation of reading an image on an original document set to the scanner whether the printer is operating or not, and the reading-operation control unit stores the image data output from the scanner into the data storing unit; and a printing-operation control unit which supplies a print data element based on at least one of the image data stored in the data storing unit to the printer.

When the copying-operation control device of the invention is connected to a scanner and a printer, it operates as a copying machine, which functions like the copying machine of the invention.

The present invention provides another copying-operation control device connectable to at least one scanner and at least one printer, the copying-operation control device comprising:

a copy job management information storing unit which includes a memory capacity capable of storing plural pieces of copy job management information including scanner identifying information and printer identifying information;

a data storing unit which stores image data output from one of the at least one scanner;

a start command accepting unit which accepts a start command for staring a copy job representing that which scanner being not in operation of the at least one scanner is designated as an image data source and which printer of the at least one printer is designated as a copy data destination;

a copy-job management information forming unit which executes such controls that when the start-command accepting unit accepts the start command for the copy job, the copy-job management information forming unit forms the copy-job management information including the scanner identifying information of the scanner designated as the image data source on the copy job and printer identifying information of the printer designated as the copy data destination on the copy job, and stores the copy-job management information into the copy job management information storing unit;

a reading-operation control unit which executes such controls that when the copy-job management information is formed by the copy-job management information forming unit, the reading-operation control unit causes the scanner identified by scanner identifying information contained in the copy-job management information to start an operation of reading an image on an original document set on the scanner, and the reading-operation control unit associates the image data which the scanner outputs as the result of the reading operation with the copy-job management information and stores the image data into the data storing unit whether or not a printer identified by printer identifying information contained in the copy-job management information is in operation;

a printing-operation control which supplies print data based on the image data, stored in the data storing unit in association with the copy-job management information earliest stored in the copy-job management information storing unit, to the printer identified by printer identifying information contained in the copy-job management information; and a management deleting unit which deletes the copy-job management information earliest stored in the copy-job management information storing unit when the operation of the reading-operation control unit, which is started when the copy-job management information is formed, ends, and the sending of the print data based on the image data associated with the copy-job management information to the printer is completed.

When the copying-operation control device is connected to one or more scanners and one or more printers, it operates like the copying machine of the invention. In this case, the scanner used for reading a document image may be selected from among one or more scanners, and the printer for outputting the result of copying operation may be selected from among one or more printers.

According to the present invention, a computer program product including instructions, wherein the instructions, when executed by a computer connected to a scanner and a printer, cause the computer to perform the steps of:

storing image data output from said scanner;

accepting a start command for starting a copy job when the scanner is not in scanning operation;

causing the scanner to start a reading operation of reading an image on an original document set to the scanner as the image data, and storing the image data output from the scanner into the computer whether the printer is operating or not when the start command for the copy job is accepted; and supplying print data based on the at least one image data stored in the computer to the printer.

Accordingly, when the program is executed, a system including a scanner, a printer and a computer may be operated like the copying machine of the invention.

The present invention provides another copying machine comprising:

a reading unit which reads an image on an original document;

a printing unit which prints on a printing sheet;

a copying condition accepting unit which accepts a designation of copying condition;

a copying-execution command accepting unit which accepts a copying start command;

a copy-job management data forming unit which forms copy-job management data based the copying condition accepted by the copying condition accepting unit when the copying-execution command accepting unit accepts the copy start command;

a managing unit which manages the copy-job management data formed by the copy-job management data forming unit; and a copy-job executing unit which refers to the copy-job management data received from the managing unit, and causes the reading unit to perform an image reading operation and causes the printing unit to perform a printing operation, wherein the copy-job management data forming unit forms copy-job management data whether or not the printing unit is in operation.

The above copying machine may be realized such that the copy-job management data forming unit forms the copy-job management data including information of the reading operation and information of the printing operation; the managing unit is capable of managing a plurality of copy-job management data, and transfers another copy-job management data to the copy-job executing unit at a time point that a reading operation of a copy job being currently executed ends; and the copy-job executing units refers to the information of the reading operation and the information of the printing operation which are contained in the copy-job management data received from the managing unit, and concurrently operates the reading unit and the printing unit.

The copying machine may also be realized such that the copying machine includes a job cancel accepting unit which accepts the designation of the copy job to be canceled, and the managing unit manages the copy-job management data in the order of forming the copy-job management data, causes the copy-job executing unit to execute the copy-job management data in the data forming order, and abandons the copy-job management data on the copy job when the job cancel accepting unit accepts the designation of the copy job to be canceled.

The present disclosure relates to the subject matter contained in Japanese patent application Nos. 2000-195506 (filed on Jun. 29, 2001) and 2001-105525 (filed on Apr. 4, 2001), which are expressly incorporated herein by reference in their entireties.

BRIEF DESCRIPTION OF THE DRAWINGS

FIG. 10 is a diagram showing a screen a copy process screen presented by the operating device.

FIG. 11 is a diagram showing a list of copy-job management information stored in the main body of the copying-operation control device.

DESCRIPTION OF THE PREFERRED EMBODIMENTS

The preferred embodiments of the present invention will be described with reference to the accompanying drawings.

Figure 1:
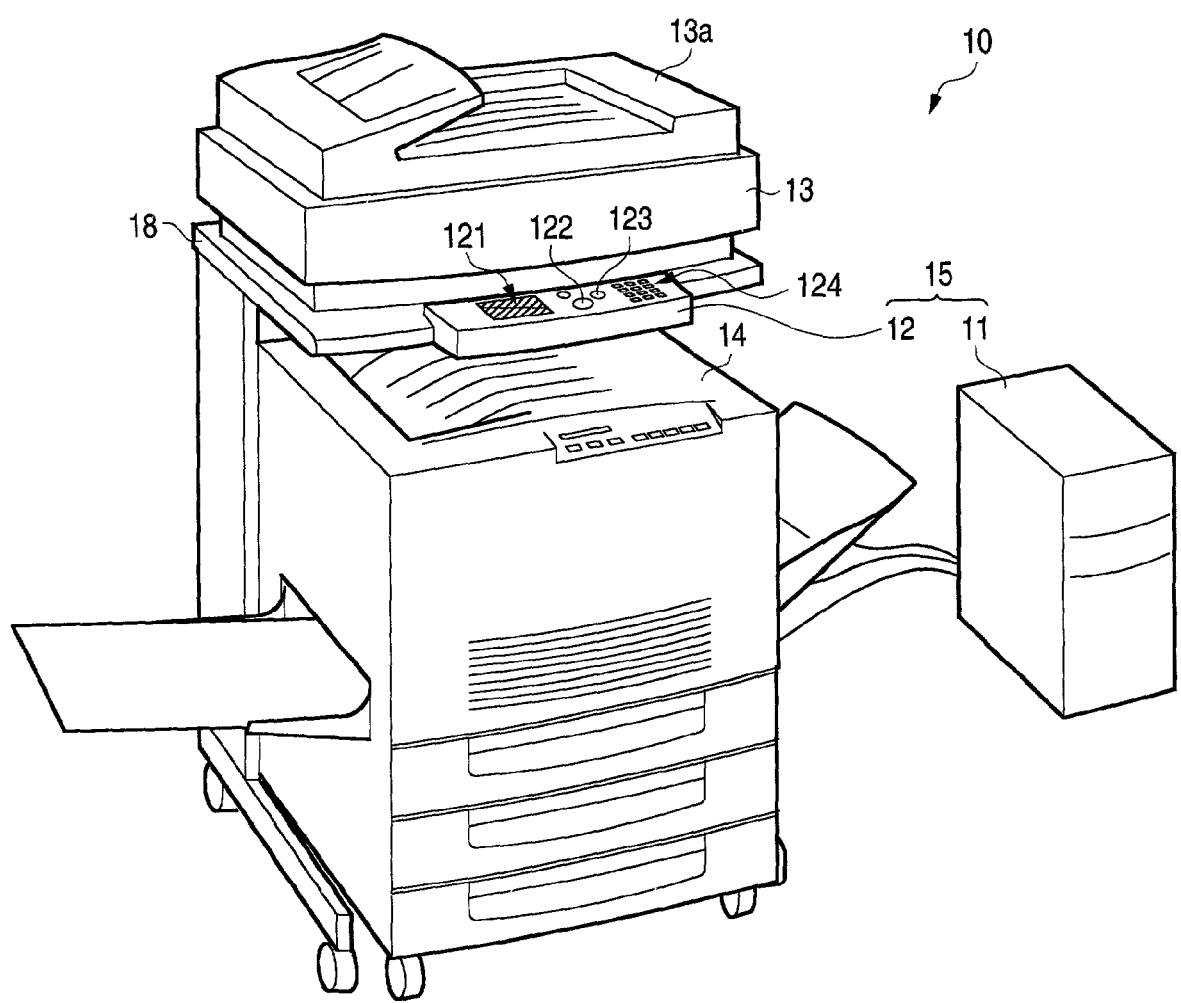
FIG. 1 is an outer appearance of a copying machine which is an embodiment of the present invention.
Figure 2:
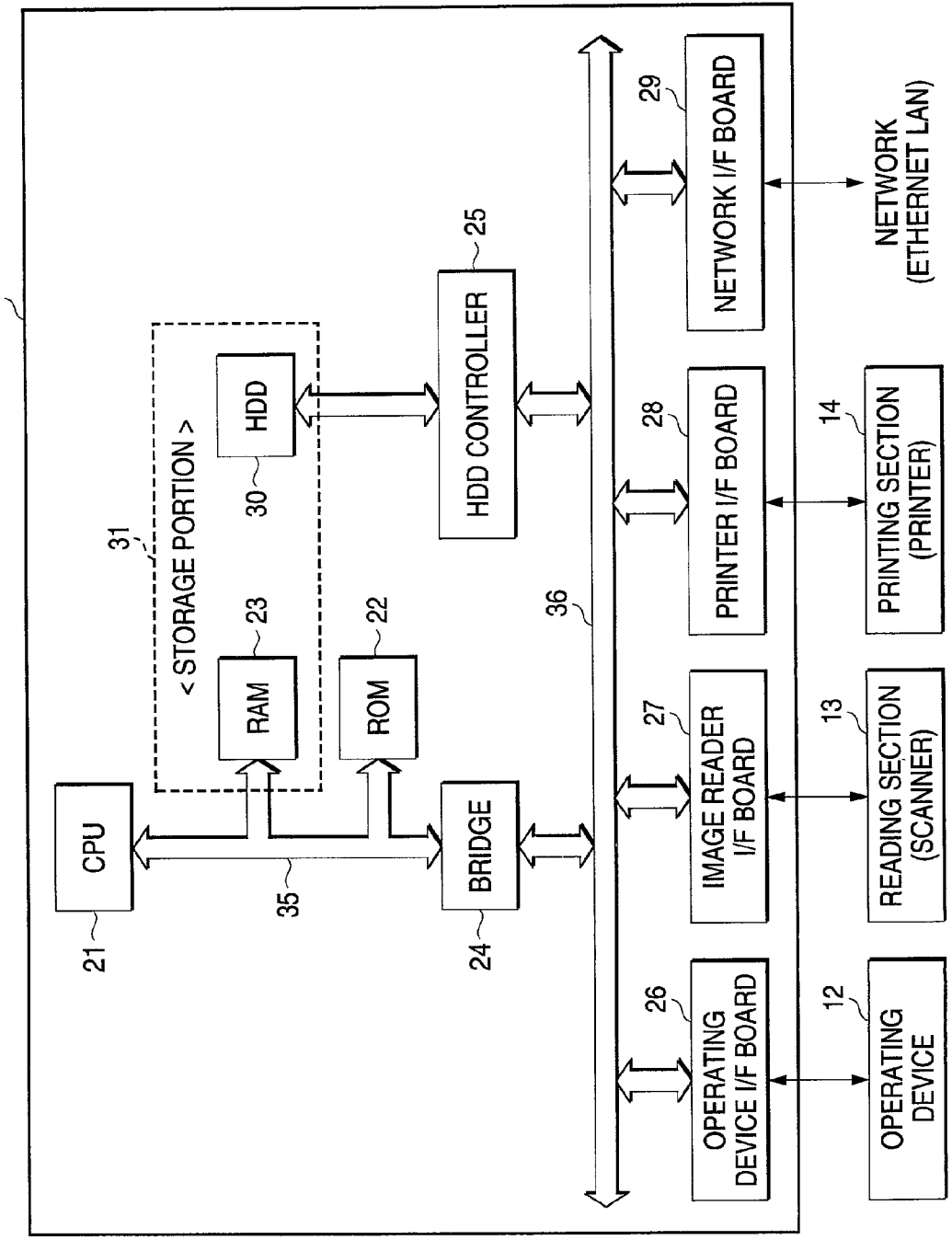
FIG. 2 is a block diagram showing a hardware arrangement of the copying machine of the invention.

An arrangement of a copying machine which is an embodiment of the present invention will be described with reference to FIGS. 1 and 2. FIG. 1 is an outer appearance of a copying machine which is an embodiment of the present invention. FIG. 2 is a block diagram showing a hardware arrangement of the copying machine of the invention.

As shown in FIG. 1, a copying machine 10 of the present embodiment comprises a copying-operation control device 15 including a main body 11 and an operating device 12, a reading section 13 and a printing section 14. In the embodiment, the reading section 13 corresponds to a reading unit (or scanner) and the printing section 14 corresponds to a printing unit (or printer). Further, a section including the operating device 12 and a portion for controlling the operating device 12 and its related portions within the main body 11 of the copying-operation control device corresponds to a start-command accepting unit and a halting-command accepting unit. The main body 11 corresponds to other units.

The reading section 13 is a device (called a scanner) for optically reading an image on an original document set thereon and generating image data representing the image. In the copying machine 10, the reading section 13 is a scanner with an ADF (automatic document feeder) and an SCSI interface. The printing section 14 is a device for printing in accordance with print job data supplied. The copying machine 10 uses a color laser printer with the IEEE1284 interface for the printing section 14.

The operating device 12 is an interface between the copying machine 10 (copying-operation control device 15) and an operator (user). The operating device 12 is provided with a touch screen 121 in which a touch panel is laid on a liquid crystal display panel, a start button 122, a stop button 123, ten keys 124, and the like. The operating device 12 is mounted on a member having a predetermined shape. When the operating device 12 is combined with the reading section 13 and the printing section 14, generally, an exclusive cabinet 18 is provided for mounting the operating device 12 (for arranging the operating device 12, reading section 13 and the printing section 14 into an integral form).

The main body 11 controls the reading section 13 and the printing section 14, thereby causing the printing section 14 to output (print) a copy of an original document set on the reading section 13, and carries out controls (which will be described in detail later) in accordance with instructions given by the operator when he operates the operating device 12.

The main body 11 is a kind of computer, and as shown in FIG. 2, includes a CPU 21, a ROM 22, a RAM 23, and a bridge 24, which are interconnected through a CPU bus 35. The main body 11 further includes an HDD controller 25, an operating device I/F board 26, an image reader I/F board 27, a printer I/F board 28, and a network I/F board 29, which are connected to the bridge 24 through a general bus 36. The main body 11 further includes an HDD (hard disc drive) 30 connected to the HDD controller 25.

The CPU 21 is a circuit for controlling the respective portions within the main body 11, the operating device 12, the reading section 13 and the printing section 14. The ROM 22 is a memory for storing BIOS for controlling various hardware components forming the main body 11, and the like. The RAM 23 is a memory into which various programs within the ROM 22 and various programs in the HDD 30 are read out. The RAM 23 is also used for storing copy-job management information and storage image data (which will be described in detail later) The bridge 24 is an interface circuit between the CPU bus 35 and the general bus 36. The HDD controller 25 is a control circuit for the HDD 30 (interface circuit between the HDD 30 and the general bus 36). The HDD 30 is an auxiliary memory device for storing an operating system, various programs running under the operating system, various drivers (for controlling the reading section 13 and the printing section 14), and others. The HDD 30 is also used for temporally storing the storage image data. For ease of explanation, the memory portions of the RAM 23 and the HDD 30, which are used for temporarily storing the storage image data, will be generally expressed as a storage portion 31 (corresponding to a data storing unit).

The operating device I/F board 26 is an interface board which enables the CPU 21 to control the operating device 12. The operating device I/F board 26 includes an input/output control circuit for various electronics devices (touch screen 121, start button 122 and others) contained in the operating device 12.

The image reader I/F board 27 is an SCSI interface board which enables the CPU 21 to control the reading section 13. The printer I/F board 28 is an interface board including an image processing circuit and an interface circuit which enables the CPU 21 to control the printing section 14. The network I/F board 29 is an interface board for connecting the main body 11 to a network (it is an Ethernet LAN in the embodiment).

The main body 11 also serves as a so-called printer server. Specifically, when the main body 11 is connected to the network through the network I/F board 29, and receives a print job data from a computer on the network, the main body 11 causes the printing section 14 to print in accordance with the print job data. The main body 11 also includes such a function as to control the reading section 13 according to an instruction from a computer on the network connected thereto (the function: to cause the reading section 13 to output image data and to transmit the image data to the computer on the network).

When the main body 11 is connected to the network, the copying machine 10 may select a printer on the network for outputting the copying result, not the printing section 14. When two or more reading sections 13 are connected to the image reader I/F board 27, the copying machine 10 is able to select the reading section i3 used for reading a document image.

In the description to follow, it is assumed that the main body 11 is connected to the network, and connected to a plurality of reading sections 13. On this assumption, the operation of the copying machine 10 will be described in detail. In the description follow, the printer on the network is also expressed as the printing section 14.

FIGS. 3 to 8 show an operation procedure on a copying operation of the main body 11 (CPU 21) of the copying-operation control device. Note that, an operation procedure to be carried out in response to an instruction to halt a copy job is not shown in those figures. This operation procedure will be described later with reference to another flow chart.

Figure 3:
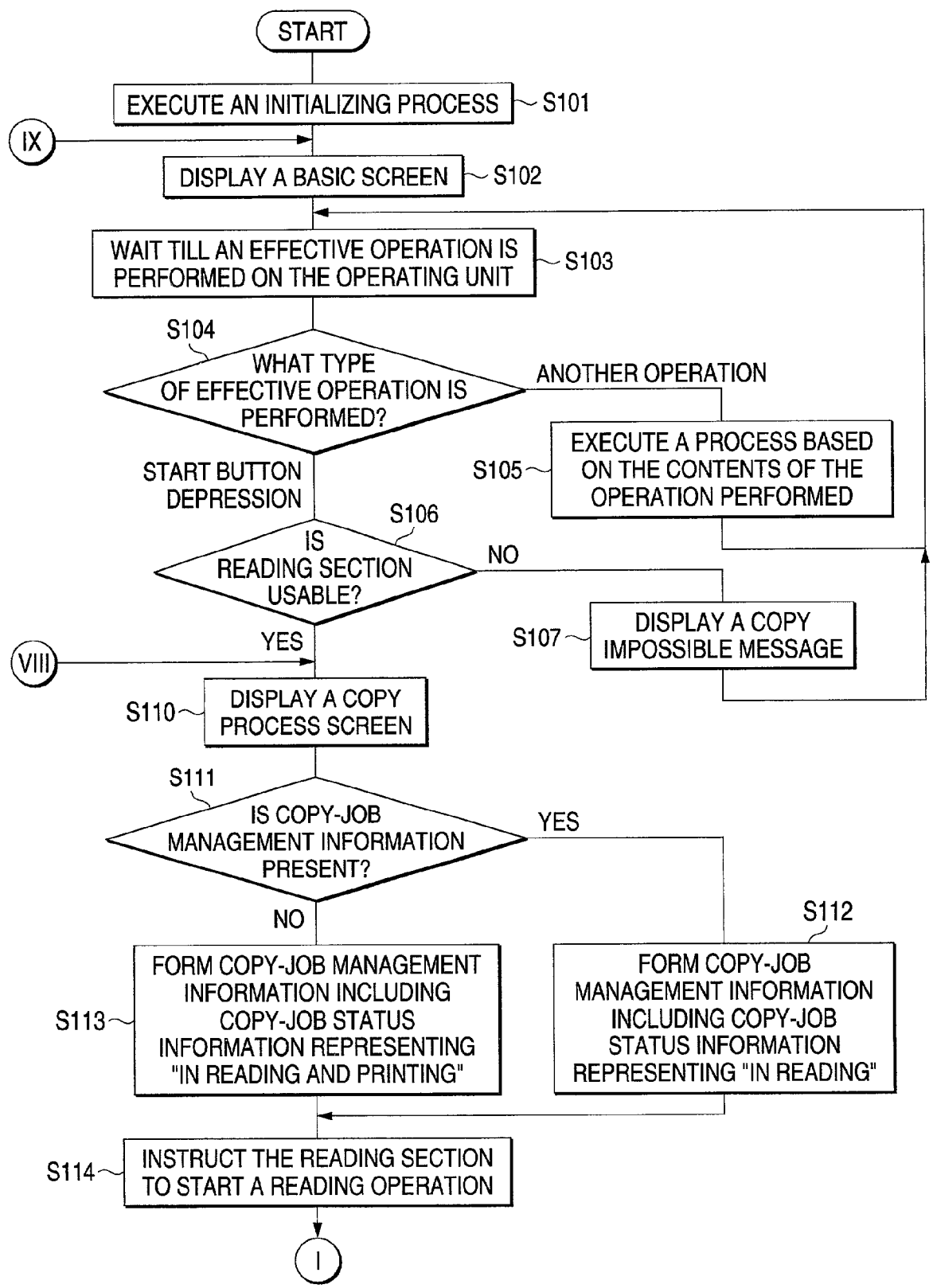
FIG. 3 is a flow chart showing a process which is executed in a main body of a copying-operation control device.

As shown in FIG. 3, upon power on, the CPU 21 in the main body 11 executes an initializing process (step S101). During the initializing process, the CPU 21 judges operation states of the respective portions within the main body 11 and the respective portions connected to the main body 11. When finding out a portion whose operation is not normal, the CPU 21 causes the touch screen (liquid display panel) 121 to display thereon information to the effect that a portion is abnormally operating (viz., the CPU 121 supplies data to display the information to the touch screen 121 via the operating device I/F board 26). When the judge result shows that every portion is normally operating, the CPU 21 ends the initializing process, and causes the touch screen 121 to display a basic screen (step S102).

Figure 9:
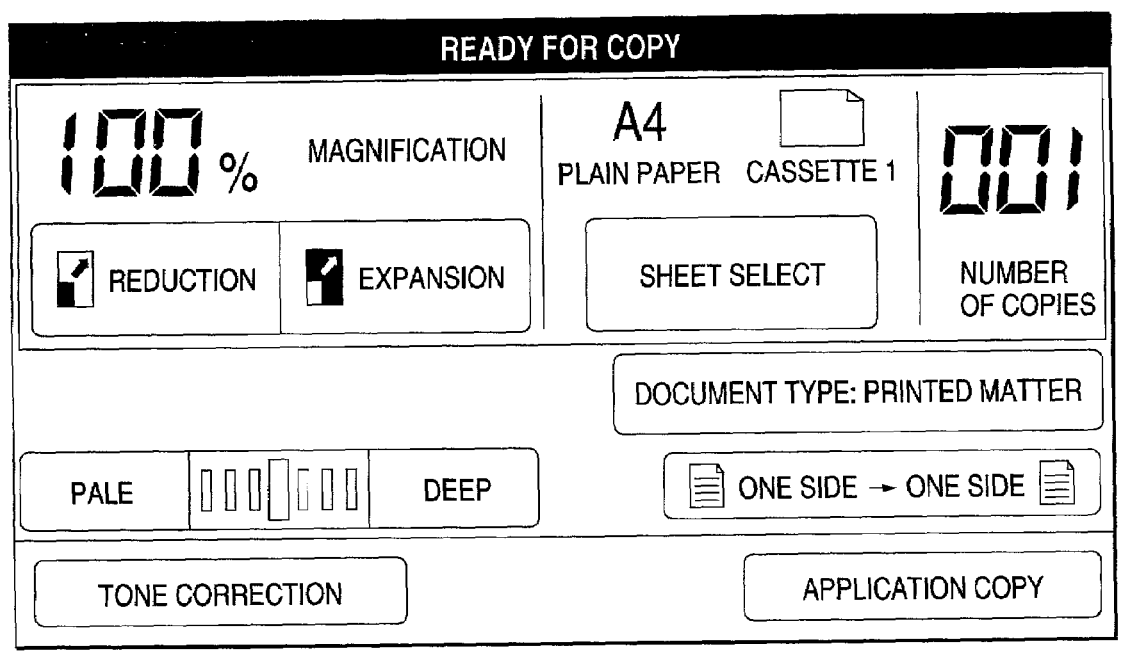
FIG. 9 is a diagram showing a basic screen presented by an operating device of the copying machine.

FIG. 9 shows an example of a basic screen presented on the touch screen 121. As shown, the basic screen contains set values of various copying conditions (power rate, paper, document type, etc.), and a plurality of buttons which the operator presses when the operator changes those values.

After the basic screen is displayed, the CPU 21 is put in a state that the CPU 21 monitors that an effective operation is performed on the operating device 12 (step S103). When detecting that an effective operation is performed, the CPU 21 ends the execution of the step S103. When the effective operation is performed in the way other than depressing the start button 122 (step S104; others), the CPU 21 executes a process to change the contents of the basic screen to a display contents based on the effective operation (step S105), and returns to the step S103.

For example, when a "pale" or "deep" button is depressed on the basic screen (FIG. 9), a step S105 is executed to move a figure position, which indicates the present set value of copy density, on a copy-density display section to the left or right. When one or more of the ten keys 124 is depressed, a step S105 is executed to change the number of copies (numerical value "001" in the upper corner in FIG. 9) to another. When a button "paper selection" button is depressed, a process is executed to cause the touch screen 121 to present a screen for selecting (or input by the ten key) the copying condition according to the button depressed in the step S105.

Specifically, the CPU executes a processing loop of steps S103 to S105, and then grasps the contents (copying conditions for the reading section 13 and the printing section 14 which are used for the copying) of a copy job to be processed when the start button 122 is depressed.

When an operation performed on the operating device 12 is the depression of the start button 122 (step S104; start button depression), the CPU 21 judges whether the reading section 13 designated for the copying by the operator (this reading section 13; referred to as a "processed reading section 13") is usable (step S106). If the processed reading section 13 is not usable (step S106; NO), the CPU 21 displays a copy impossible message for informing the operator of the copying being impossible, on the basic screen (step S107) Thereafter, the CPU 21 returns to the step S103 and waits till an effective operation is performed on the operating device 12.

When the reading section 13 is usable (step S106; YES), the CPU 21 causes the touch screen 121 to present a copy process screen thereon (step S110).

As shown in FIG. 10, the copy process screen contains a job information area 51 for displaying information on a copy job being executed, a reading area 52 for displaying a reading progress of reading a document image by the processed reading section 13, and a printing progress area 53 for display a printing progress of the printing operation by the processed printing section 14 (the printing section 14 being supplied with print job data from the main body 11 of the copying-operation control device). In a step S110 following the step S106, a copy process screen is displayed which contains a reading progress area for displaying that the reading of the document image is no started yet, and a printing progress area for displaying that the printing operation is not started yet.

After causing the touch screen 121 to display the copy process screen, the CPU 21 judges whether or not the copy-job management information is present in the PAM 23 (step S111).

A configuration of the copy-job management information will be described with reference to FIG. 11.

As illustrated, the copy-job management information contains copy job ID, forward pointer, backward pointer, copying condition information, copy job status information, reading section identifier, reading section status information, reading section reading progress information, printing section identifier, printing section status information, printing section printing progress information, printing section job ID, and storage image data management information.

As will be described in detail later, the copy-job management information is stored into the RAM 23 every time an execution command to execute a copy job is issued (the start button 122 is depressed in a state that the processed reading section 13 is usable) The copy-job management information is erased from the RAM 23 when the copy job ends in its execution (the processed printing section 14 completes the printing of the image data on all the documents to be copied and a discharging of copy sheets bearing the printed pictures thereon).

The copying condition information forming the copy-job management information comprises values indicative of various copying conditions (set values of various copying conditions when the start button 122 is depressed). The reading section identifier is identifying information for identifying the reading section 13 designated as the reading section 13 to be used for the copying by the operator. The printing section identifier is identifying information for identifying the processed printing section 14 designated as the printing section used for the copying by the operator.

The copy job ID is identifying information for identifying a copy job generated by the CPU 21. The forward pointer and the backward pointer are data which identifies a storing position of another copy job management information formed (stored) on the RAM 23 and arranges the copy job management information on the RAM 23 in information forming order. Specifically, the forward pointer and the backward pointer are data in which its values are set and altered as described below.

For the copy-job management information formed in a state that another copy-job management information is absent, a predetermined value indicating that the self-copy-job management information is the latest information is set for the backward pointer, and a value equal to that is set for the forward pointer (when only one piece of copy-job management information is present, its forward pointer is not used actually) At the time of its formation, the leading job pointer (data stored in a given memory area of the RAM 23) for managing a memory position of the oldest copy-job management information is changed to data indicative of a memory position of the copy-job management information formed.

For copy-job management information formed in a state that one or more pieces of copy-job management information are present, data indicative of a memory position of the copy-job management information previously formed (the copy-job management information whose backward pointer is a predetermined value) is set for the forward pointer, and a predetermined value indicating that the self-copy-job management information is the latest information is set for the backward pointer. At the time of its formation, the backward pointer of the copy-job management information previously formed is changed to data indicative of a memory position of copy-job management information formed anew.

When the copy-job management information is erased since the copy job ends or the halt of the copy job is instructed, a value of the backward pointer (the leading job pointer when the copy-job management information to be erased is the oldest one) of the copy-job management information which is indicated by the forward pointer of the copy-job management information to be erased is changed to a value equal to that of the backward pointer of the copy-job management information to be erased. When the value of the backward pointer of the copy-job management information to be erased is not a predetermined one (the copy-job management information to be erased is not the latest one), a value of the forward pointer of the copy-job management information indicated by its backward pointer is changed to a value equal to that of the forward pointer of the copy-job management information to be erased.

That is, in the main body 11, the copy-job management information stored at a memory position indicated by the leading job pointer is set to the oldest copy-job management information, and the values of the forward pointer and the backward pointer of the copy-job management information are set and changed so that the previous and next copy-job management information are respectively stored at positions indicated by the forward pointer and the backward pointer of certain copy-job management information.

The copy-job status information forming the copy-job management information is information indicative of a status (processing status) of a copy job whose contents are defined by the copying condition information, the reading section identifier and the printing section identifier. Any one of "In reading and printing", "In reading" and "Waiting" is set as copy-job status information to each copy-job management information of the RAM 23 in accordance with a status of the copy job on the copy-job management information.

Specifically, the main body 11 of the copying-operation control device is arranged so as to independently and concurrently execute the following two process; a process to obtain image data of one or more documents to be copied from the processed reading section 13 (referred to as "reading control process"), and a process to supply print job data for outputting (printing) copy/copies of the document(s) to the processed printing section 14 and to monitor the end of sheet discharging (referred to as "printing control process"). Further, the main body 11 is arranged such that when the reading control process ends, even if the printing control process of the copy job whose reading control process is not yet completed, the main body 11 receives a command to execute a next copy job and starts the reading control process for the next copy job.

Accordingly, a copy job whose execution is instructed in the copying machine 10 takes one of the following statuses: 1) a status in which the reading control process and the printing control process are under execution, 2) a status in which the printing control process is under execution, but the reading control process is not under execution, 3) a status in which the reading control process is completed in execution and the printing control process is still under execution, and 4) a status in which the reading control process is completed in execution and the controller waits for the execution of the printing control process. Therefore, when the status of the copy job is in one of the statuses 1) to 4), the copy-job status information in the copy-job management information for this copy job is correspondingly set in "In reading and printing", "In reading", "In printing" or "Waiting".

The reading section status information forming the copy-job management information is information indicating whether or not the reading operation is performed by the reading section 13 identified by the reading section identifier (the reading section 13 is to be subjected to the reading control process). The reading section reading progress information is information indicating which page of the documents and which location of the page of the documents that the processed reading section identified by the reading section identifier has read.

The printing section status information is information indicating whether or not the supplying of print job data to the printing section 14 identified by the printing section identifier is actually started. When the copy-job management information is formed, "Not yet started" indicating that the supply of the print job data is not stated is set as the printing section status information. The printing section status information is changed to "In printing" when the supply of the print job data to the printing section 14 identified by the printing section identifier is started. In other words, even when the copy-job status information is changed to "In reading and printing" or "In printing", "Not yet started" is maintained for the printing section status information when the printing section 14 cannot start supplying the print job data.

The printing section printing progress information is information indicating which page of the image data and which location of the page of the image data that the printing section 14 identified by the printing section identifier has supplied and printed. The printing section job ID is identifying information assigned to a print job accepted by the printing section 14 identified by the printing section identifier. When the printing section 14 identified by the printing section identifier is a device which assigns job IDs to print jobs supplied thereto and manages them (viz., it is capable of accepting a plurality of print jobs), the job ID is set as this printing section job ID. This printing section job ID is used for instructing the such printing section 14 to halt a specific print job.

The storage image data management information is information indicative of a memory position of the storage image data related to the copy-job in the storage portion 31. The storage image data is image data which is obtained from the processed reading section 13 but cannot be transferred to the printing section 14, and hence is stored in the storage portion 31. As will be described in detail subsequently, the image data is stored into the storage portion 31 every predetermined amount of data. The image data (storage image data) represented by the predetermined amounts of data is read out of the storage portion 31, processed the image processing and supplied to the printing section 14 in order of time points where the image data are stored. When the use of the data is completed, those predetermined amounts of image data are abandoned (the memory area occupied by the image data is made free). The storage image data management information contains such information allowing an access, and the storage image data management information is updated when the predetermined amount of image data is stored into the storage portion 31 or the storage image data is abandoned.

Returning to FIG. 3, the description of the operation of the main body 11 will be continued.

When the copy-job management information is not stored into the RAM 23 (step S111; NO), the CPU 21 forms on the RAM 23, the copy-job management information which includes copying condition information representing the contents of a copy job whose execution is instructed, the reading section identifier and printing section identifier, the copy-job status information representing "In reading and printing", and the printing section status information representing "Not yet started" (step S113) Then, the CPU 21 instructs the processed reading section 13 to start a reading operation (step S114).

When the copy-job management information is stored in the RAM 23 (step S111; YES), the CPU 21 forms on the RAM 23, the copy-job management information which include the copying condition representing the contents of a copy job whose execution is instructed, the reading section identifier, the printing section identifier, the copy-job status information representing "In reading", and the printing section status information representing "Not yet started" (step S112). Thereafter, the CPU 21 advances to a step S114, and instructs the processed reading section 13 to start a reading operation of reading an image on an original document.

Figure 4:
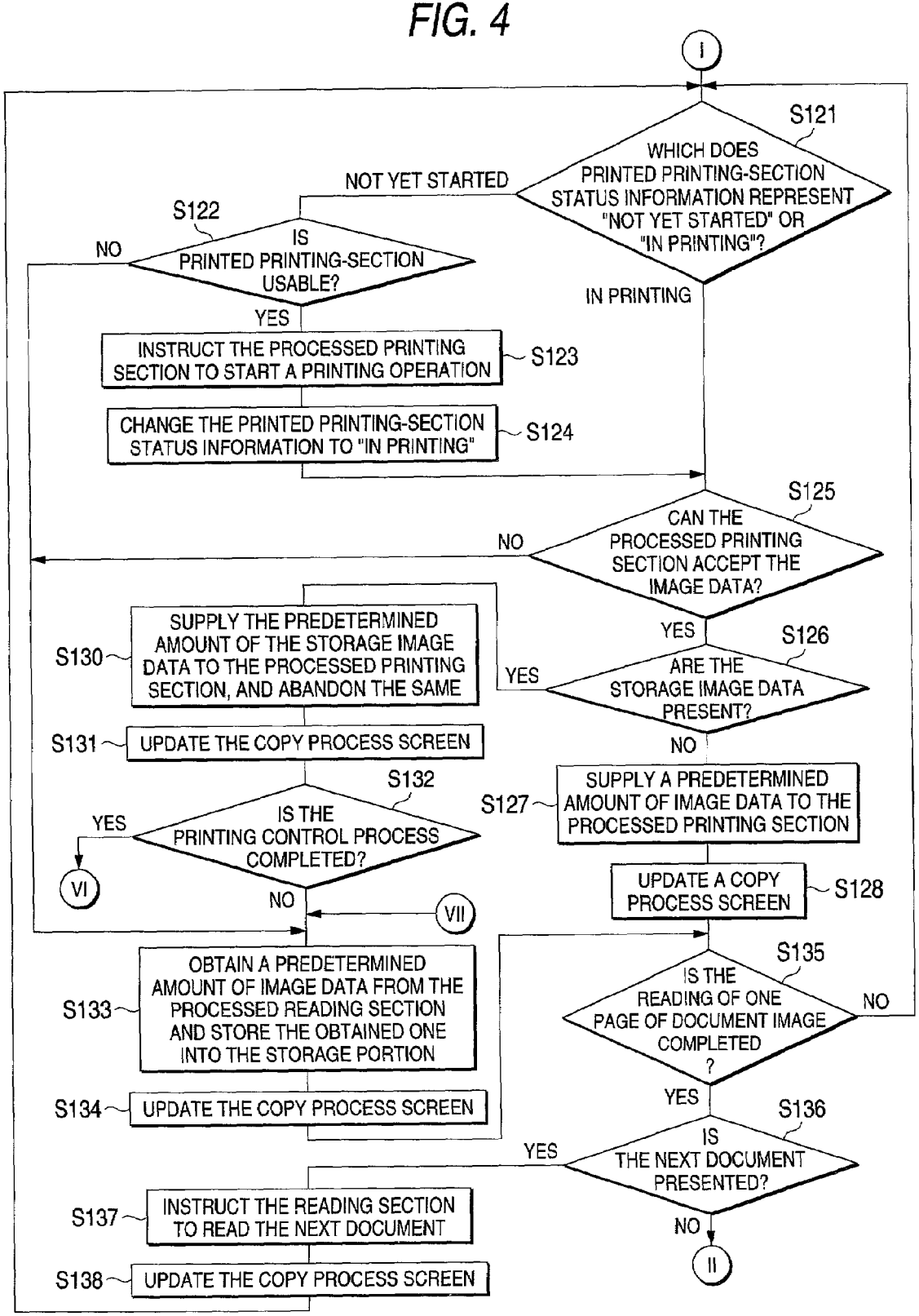
FIG. 4 is a flow chart showing the process executed in the main body of the copying-operation control device.

As shown in FIG. 4, after instructing the processed reading section 13 to start the document reading operation, the CPU 21 judges whether the printing section status information of the copy-job management information (copy-job management information in which the leading job pointer indicates its storing position) which is earliest stored in the RAM 23 represents "Not yet started" or "In printing" (step S121). Specifically, when the step S111 is branched to the "NO" side, the copy-job management information formed by the step S113 is the oldest copy-job management information, its printing section status information is processed for judgment in the step S121. When the step S111 is branched to the YES side, the printing section status information of copy-job management information, which is different from that formed by the step S112, is processed in the step S121.

For ease of explanation, copy-job management information which is earliest stored in the RAM 23 is referred to as "printed copy-job management information". A copy job (copy job to be subjected to the printing control process) which is managed by the printed copy-job management information is referred to as "printed copy job". Printing section status information of the printed copy-job management information is referred to as "printed printing-section status information". The copy job management information (copy-job management information whose backward pointer has a predetermined value) which is the latest information on the RAM 23, is referred to as "read copy-job management information". A copy job (which is subjected to the reading control process) which is managed by the read copy-job management information is referred to as "read copy job".

When the printed printing-section status information represents "In printing" (step S121; in printing), the CPU 21 advances to a step S125 (to be described in detail later). When the printed printing-section status information represents "Not yet started" (step S121; not yet started), the CPU 21 judges whether the processed printing section 14 (printing section 14 identified by the printing section identifier in the printed copy-job management information) is usable, that is, whether the processed printing section 14 is used by another computer (S122) When the processed printing section 14 is usable (step S122; YES), the CPU 21 instructs the processed printing section 14 to start a printing operation (supplies a control command group for designating copying conditions to the printer) (step S123). Then, the CPU 21 changes the printed printing-section status information to "In printing" (step S124), and advances to step S125.

In the step S125, the CPU 21 judges whether the processed printing section 14 is put in such a state that it accepts a predetermined amount of image data. If the processed printing section 14 can accept the image data (step S125; YES), the CPU 21 judges whether the storage image data on the copy job to be printed are stored in the storage portion 31 (step S126).

When the storage image data on the printed copy job is not stored in the storage portion 31 (step S126; NO), the CPU 21 obtains a predetermined amount of image data (image data of plural lines which consists of image data elements each of byte length in the embodiment) from the processed reading section 13, and supplies the obtained image data to the processed printing section 14 (step S127). In the step S127, the image data obtained from the processed reading section 13 is image processed as specified by the copying condition information. The image data thus processed is transferred to the printing section 14. Further in the step S127, the reading section reading progress information and the printing section printing progress information of the read copy-job management information (read copy-job management information=printed copy-job management information when this step is executed) are updated.

After the execution of the step S127, the CPU 21 updates the display contents of the reading progress area 52 and the printing progress area 53 on the copy process screen (viz., it changes the copy process screen to another for showing that the reading control process and the printing control process have progressed) (step S128).

Thereafter, the CPU 21 judges whether the reading of one page of document image is completed (step 135). If the answer is NO (step S135; NO), the CPU executes the process starting from the step S121.

Through the repeating of such procedure, the printing section 14 is put in a state that the printing section 14 cannot accept the data (step S125; NO), the CPU 21 obtains a predetermined amount of image data from the processed reading section 13 and stores the obtained image data as storage image data into the storage portion 31 (step S133) When the step S133 is executed, the CPU refers to the storage image data management information of the read copy-job management information, and updates it. When the memory capacity capable of storing the predetermined amount of image data is not left in the storage portion 31, the CPU executes a step S135, while not executing the steps S133 and S134 (not illustrated).

In the step S122 which is executed since the printed printing-section status information represents "Not yet started" (step S121; Not yet started), when it is detected that the processed printing section 14 is not usable (step S122; NO), the CPU 21 executes the step S133 is executed.

After the CPU21 executes the step S133, the CPU21 updates the display contents of the reading progress status area 52 on the copy process screen (step S134), and executes a step S135.

When the processed printing section 14 is ready for accepting the data (step S125; YES), and the storage image data on the copy job to be printed is stored in the storage portion 31 (step S126; YES), the CPU 21 transfers the predetermined amount of the oldest storage image data stored in the storage portion 31 to the printing section 14, and abandons the predetermined amount of the storage image data (makes the memory area occupied by the storage image data free) (step S130). In this step S130, the storage image data is image-processed as indicated by the copying condition information, and the storage image data thus processed is transferred to the processed printing section 14. At the time of executing the step S130, the CPU refers and updates the storage image data management information of the printed copy-job management information, and updates the printing section printing progress information.

Then, the CPU 21 changes the copy process screen to a screen showing that the printing control process has progressed by a predetermined amount of processing (step S131). The CPU 21 judges whether the printing control process is completed (step S132), and if it is not yet completed, the CPU 21 (step S132; NO), the CPU 21 executes the step S133 and the subsequent ones.

When repeating such a process execution, the reading of one page of document is completed (step S135; YES), and then CPU 21 judges whether the next document is present (step S136). If it is present (step S136; YES), the CPU instructs the reading section 13 to read the next document (step S137), and changes the copy process screen to a screen showing that the reading of the next document is started (step S138), and returns to the step S121.

Figure 5:
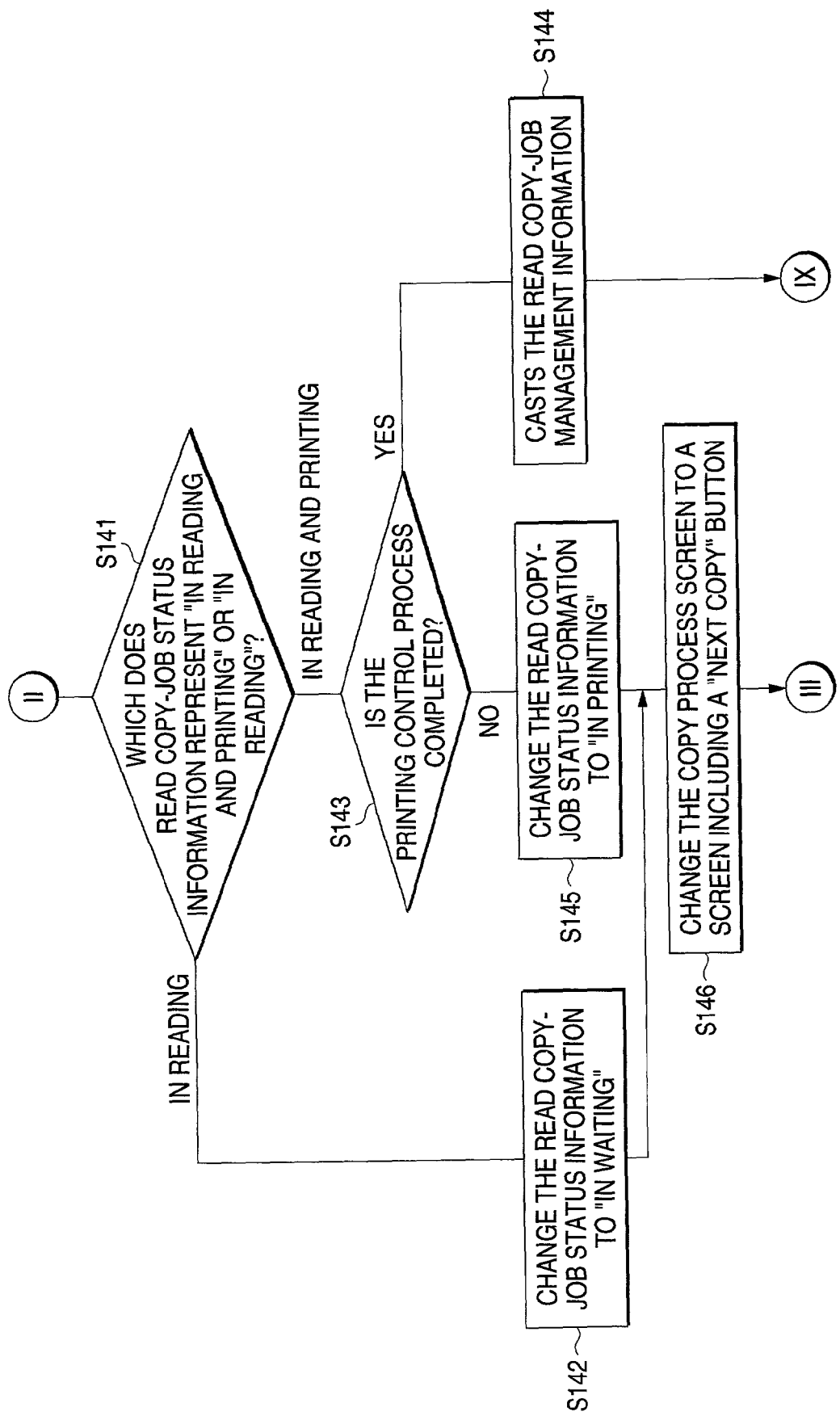
FIG. 5 is a flow chart showing the process executed in the main body.

When the next document is absent (step S136; NO), that is, the reading control process on the copy job to be read is completed, the CPU 21 judges whether the read copy-job status information (copy-job status information of the read copy-job management information) represents "In reading and printing" or "In reading" (step S141), as shown in FIG. 5. In other words, the CPU judges whether the copy job of which the reading control process is completed is a copy job of which the printing control process has started or a copy job which only the reading control process has been executed (if the copy job to be read is equal to the copy job to be printed).

When the read copy-job status information represents "In reading and printing" (step S141; in reading and printing), that is, when the copy job to be read is equal to the copy job to be printed, the CPU 21 judges whether the printing control process is completed (step S143). When the printing control process is completed (step S143; YES), the CPU 21 abandons the read copy-job management information (step S144), and returns to the step S102 (FIG. 3). The step S144 is executed in following case: a copy job is started in execution after the "in reading and printing" is set to the copy-job status information (the copy job is not a copy job in which the copy job status information is changed from "in printing" to "In reading and printing"); the copy job undergoes processes shown in FIG. 4; and the process is ended without executing the step S133.

Figure 12:
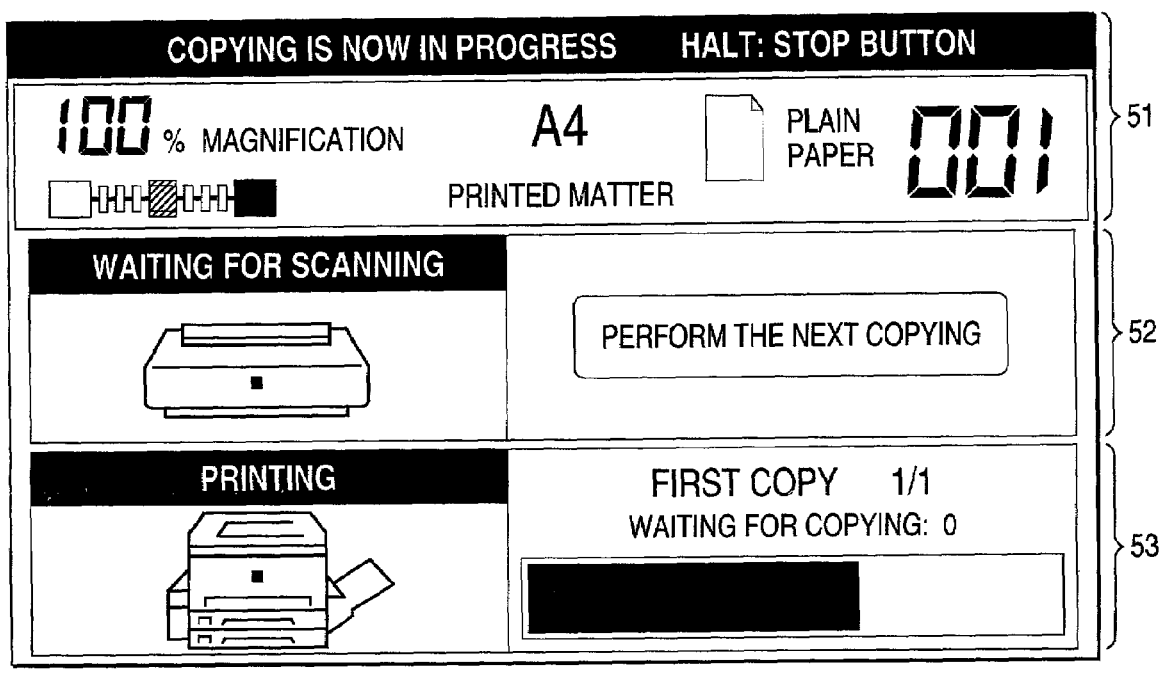
FIG. 12 is a diagram showing a copy process screen, which is presented by the operating device when a reading control process is completed.

When the printing control process is not completed (step S143; NO), the CPU 21 changes the read copy-job status information (=printed copy-job status information) to "In printing" (step S145), and changes the copy process screen (step S146) to another screen. In this step S146, the CPU 21 changes the copy process screen to a screen including a job information area 51 showing that "Copy reservation" (setting of the copying conditions for the next copying) may be carried out, and the reading progress status area 52 showing a "next copy" button (as shown in FIG. 12).

When the read copy-job status information represents "In reading" (step S141; in reading), viz., when the copy-job to be read is different from the copy job to be printed, the CPU 21 changes the read copy-job status information to "In waiting" (step S142), and executes a step S146.

Figure 6:
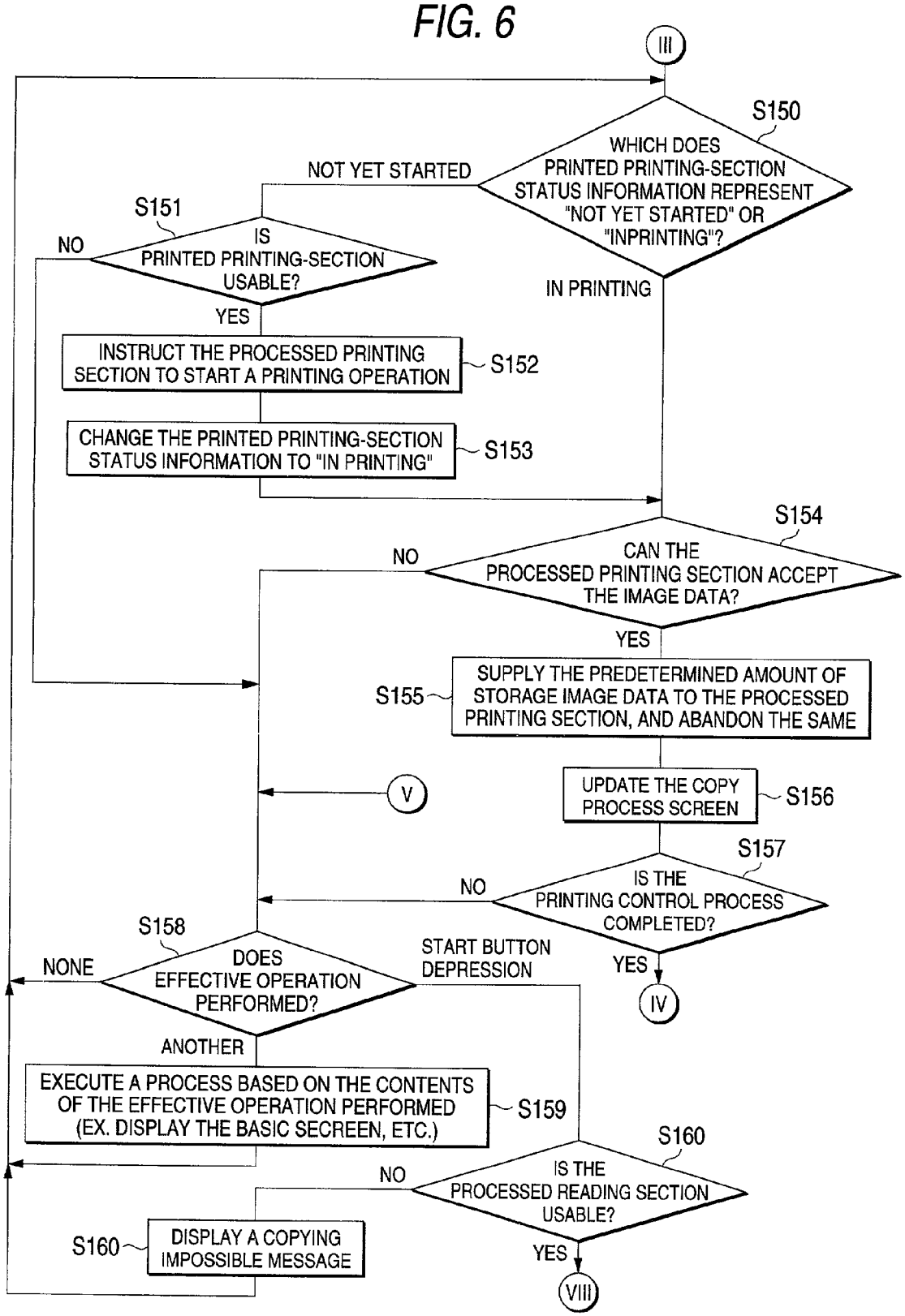
FIG. 6 is a flow chart showing the process executed in the main body.

Then, it causes the touch screen 121 to present the copy process screen including a "next copying" button and then executes a process shown in FIG. 6.

Specifically, the CPU 21 first judges whether the printed printing-section status information represents "In printing" or "Not yet started" (step S150). When it represents "In printing" (step S150; in printing), the CPU 21 advances to a step S154 (will be described in detail later). When it represents "Not yet started" (step S150; not yet started), the CPU 21 judges whether the processed printing section 14 is usable (step S151). When the processed printing section 4 is usable (step S151; YES), the CPU 21 instructs the processed printing section 14 to start a printing operation (step S152). Then, the CPU 21 changes the printed printing-section status information to "In printing" (step S153), and advances to a step S154.

In the step S154, the CPU 21 judges whether the processed printing section 14 is ready for accepting the predetermined amount of image data. When the processed printing section 14 is ready for accepting it (step S154; YES), the CPU 21 supplies the oldest storage image data to the processed printing section 14, and abandons the supplied one (step S155). In the step S155, as in the step S130, the CPU 21 refers and updates the storage image data management information of the printed copy-job management information, and updates the printing section printing progress information.

Then, the CPU 21 changes the copy process screen to a screen showing that the printing control process has progressed (step S156), and then judges whether the printing control process has been completed (step S157).

When it is not completed (step S157; NO), the CPU 21 advances to a step S158 to judge whether an operation is performed on the operating device 12.

When no effective operation is performed on the operating device 12 (step S158; none), the CPU 21 returns to the step S150. When an effective operation except the depression of the start button 122 is performed on the operating device 12 (step S158; another), the CPU 21 executes a process based on the contents of the effective operation performed (step S159), and returns to the step S150.

Figure 13:
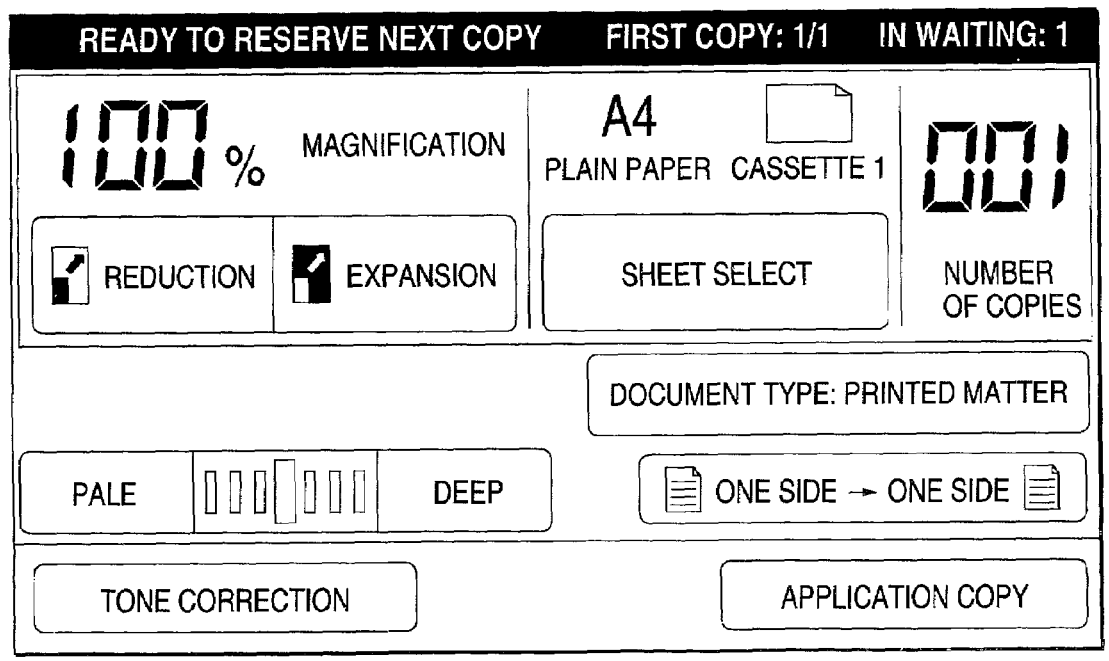
FIG. 13 is a diagram showing a basic screen presented by the operating device when a "next copying" button is depressed.

When the CPU 21 detects in the step S158 that the "next copying" button has been depressed, the CPU 21 causes the touch screen 121 to display the basic screen showing that the copy job being executed is present. For example, when the copy job being executed and the copy job being in a waiting or stand-by state are present, the CPU 21 causes the touch screen 121 to display the basic screen in which the copy job being executed and the copy job being in a waiting state are present ("first page 1/1 in waiting 1") in the upper part of the screen (FIG. 13).

When the start button 122 is depressed (step S158; start button depression), the operating device 12 judges whether the processed reading section 13 is usable (step S160). If it is not usable (step S160; NO), the CPU 21 displays a copying impossible message on the touch screen 121 (step S161), and returns to the step S150. If it is usable (step S160; YES), the CPU 21 returns to step S110 (FIG. 3).

When the processed printing section 14 is not usable (step S151; NO) or when the processed printing section 14 is put in a state that it cannot accept the predetermined amount of image data (step S154; NO), the CPU 21 executes the process starting from the step S158.

After the predetermined amount of storage image data is supplied to the printing section 14 (step S155), when the CPU 21 detects that the printing control process is completed (step S157; YES), the CPU 21 carries out the process shown in FIG. 7.

Specifically, the CPU 21 abandons the printed copy-job management information (step S170). Thereafter, the CPU 21 judges whether the copy-job management information is present (step S171). When it is not present (step S171; NO), the CPU returns to the step S102 (FIG. 3). That is, the CPU 21 causes the touch screen 121 to display the basic screen, and then waits till the copying conditions are set (altered) or a copying start instruction is given (the start button 122 is depressed).

Figure 7:
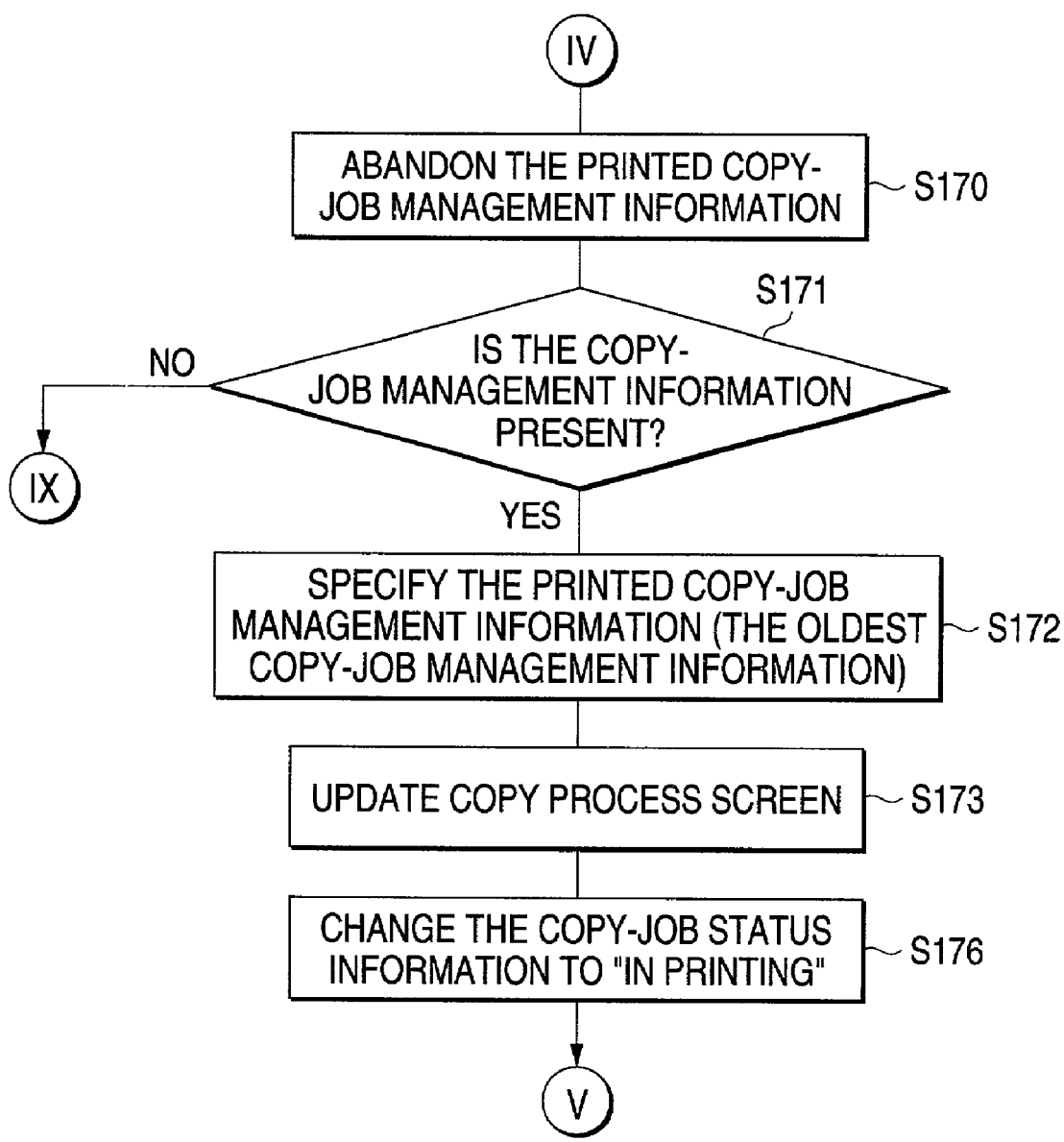
FIG. 7 is a flow chart showing the process executed in the main body.

When the copy-job management information is present (step S171; YES), the CPU21 specifies the printed copy-job management information (the oldest copy-job management information) (step S172). And the CPU 21 changes the printed copy-job status information (copy-job status information of the printed copy-job management information) to "In printing" (step S176). The process shown in FIG. 6 is carried out when the reading control process is not executed, and the process shown FIG. 7 is started in execution when the printing control process ends during the execution of the FIG. 6 process. Accordingly, when the step S172 is executed, the CPU 21 specifies that the copy-job status information of the copy-job management information (the printing-section status information represents "Not yet started") represents "In waiting". In the step S176, the copy-job status information is changed from "In waiting" to "In printing".

The CPU 21 rewrites the printed copy-job status information, and then starts the process starting from the step S158 shown in FIG. 6.

Also when the CPU 21 detects that the printing control process is completed when the reading control process is being executed, CPU 21 executes a similar process.

Specifically, when the CPU 21 detects that the printing control process is completed during the reading control process is being executed (step S132; YES in FIG. 4), firstly, the CPU 21 abandons the printed copy-job management information (step S180). Thereafter, the CPU 21 specifies the printed copy-job management information (the oldest copy-job management information) (step S182). When the printed copy-job status information (copy-job status information of the printed copy-job management information) represents "In reading" (step S184; in reading), the CPU 21 changes the printed copy-job status information to "In reading and printing" (step S185). When the printed copy-job status information represents "In waiting" (step S184; in waiting), the CPU changes the printed copy-job status information to "In printing" (step S186).

After the CPU rewrites the printed copy-job status information by such a procedure, the CPU 21 returns to the step S133 (FIG. 4).

A control operation by the copying-operation control device 15 will be described in detail with reference to FIG. 14 and FIGS. 3 through 8. In the description to be given hereafter, the reading section 13 and the printing section 14 are not used by another computer (the steps are branched to the YES side in the steps to judge if the printing section 14 is usable, such as steps S106 and S122).

The execution of a copy job A is instructed at a time point t0 at which the copy-job management information is not yet stored in the RAM 23.

In this case, the step S111 branches to the "NO" side (FIG. 3). Only one copy job management information (the oldest and latest copy-job management information) is formed, and "In reading and printing" is set as the copy-job status information and "Not yet started" is set up as the printing-section status information. Accordingly, the copy-job management information is handled as the printed copy-job management information and the read copy-job management information.

Figure 14:
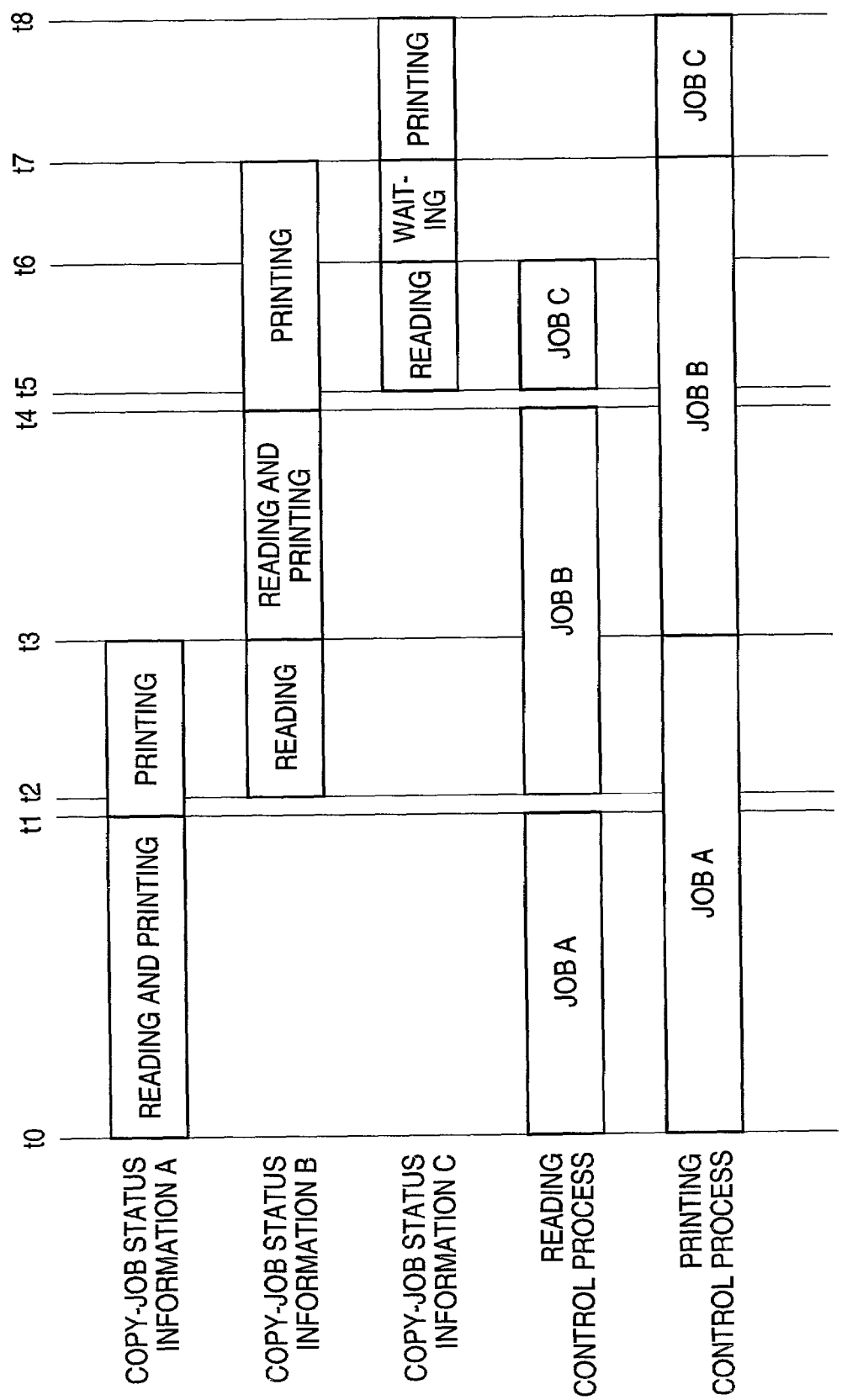
FIG. 14 is a timing chart showing a control operation of the main body of the copying-operation control device.

As shown in a chart of FIG. 14, when the execution of the copy job A is instructed to start at a time point t0, the copy-job status information (copy-job status information A in the figure) of the copy-job management information on the copy job A represents "In reading and printing" (in the figure, "reading &printing"). And a state that an object to be processed by the reading control process and an object to be processed by the printing control process are both the copy job A, is set up, and the process shown in FIG. 4 is started in execution.

At this time point, the printed printing-section status information represents still "Not yet started". Then, in the step S121 of FIG. 4, the step S121 is branched to the "Not yet started" side. Since the processed printing section 14 is not used by another computer, the steps S123 and S124 are executed so that control data is supplied to the processed printing section 14 and the printed printing-section status information is rewritten into "In printing".

The processed printing section 14 which does not yet receive image data is ready for accepting the image data. In the step S125 following the step S124, the step S125 is branched to the "YES" side. At this time point, the storage image data is not yet stored in the storage portion 31, thus, the step S126 is branched to the "NO" side. As a result, the step 127 is executed, so that the predetermined amount of image data obtained from the reading section 13 is supplied to the processed printing section 14 without stored in the storage portion 31. Then, the step S128 is executed to change the copy process screen presented in the step S110 to a screen showing that the reading control process and the printing control process have progressed.

Subsequently, the step S135 is branched to the "NO" side, and the step S121 is executed again. At this time point, the printed printing-section status information represents "In printing". Accordingly, the step S121 is branched to the "In printing" side. The steps S125 and S126 are respectively branched to the "YES" side and the "NO" side, and the steps S127 and S128 are executed.

When the processed printing section 14 is put in a state that it cannot accept the image data before the reading control process for all the original documents is completed (before the step S136 is branched to the "NO" side), the step S125 is branched to the "NO" side. And the step S133 executes a process in which the predetermined amount of image data obtained from the reading section 13 is stored into the storage portion 31 without supplied to the printing section 14. As the result of processing by the step S134, the copy process screen is changed to a screen showing that only the reading control process has progressed.

When the processed printing section 14 becomes ready for accepting the image data during the execution of the process in which the predetermined amount of image data is stored into the storage portion 31 without supplied to the processed printing section 14, the step S125 is branched to the "YES" side. And in the step S126, the storage image data is present, and hence the step is branched to the "YES" side. Accordingly, the step S130 is executed, so that part (the predetermined amount of image data earliest stored) of the storage image data stored in the storage portion 31 is supplied to the processed printing section 14. The subsequent step S131 is executed, so that the copy process screen is changed to a screen showing that the printing process has progressed.

At this time point, since the printing control process on the copy job A is not yet completed (there is no case that before the reading control process on a copy job is completed, the printing control process on that copy job is completed), the step S132 is branched to the "NO" side. As a result, the predetermined amount of image data generated by the reading section 13 in the step S133 is stored into the storage portion 31. In the step S134, the copy process screen is changed to a screen showing that the reading control process has progressed.

As the result of repeating the execution of the steps S130 to S134, when the reading control process on the copy job A is completed at time point t1 (FIG. 14) (step S136; NO), the step S141 (FIG. 5) is executed to judge whether the copy job A has undergone both the reading control process and the printing control process or only the reading control process.

Since the copy job A has undergone both the reading control process and the printing control process (the copy-job status information A represents "In reading and printing"), the CPU judges whether the printing control process is completed. When the step S133 is executed during the execution of the copy job A, the copy-job status information A as the read copy-job status information is changed to "In printing" since there is no case that the printing control process is completed at this stage. Thereafter, a copy process screen showing that an instruction to execute the next copy job is accepted is displayed on the touch screen 121. By the process shown in FIG. 6, the CPU continues the printing control process on the copy job A while monitoring whether a new instruction to execute the copy job is present or not.

When the execution of a copy job B is instructed by depressing the start button at the preceding time point t2 (FIG. 14) before the printing control process on the copy job A ends, the step S160 is executed and the step is branched to the "YES" side. As a result, the process is started from the step S110 (FIG. 3). In this case, the copy-job management information is present, and hence the step S112 is executed to form read copy-job management information on the copy job B whose the copy-job status information represents "In reading".

The process shown in FIG. 4 is started in a state that the copy job to be read (=copy job A) is different from the copy job to be printed (=copy job B) (see FIG. 14). In this state, there is a case that the printing control process on the copy job B may be completed before the reading control process on the copy job A is completed, and that the printing control process on the copy job B may be completed after the reading control process on the copy job A is completed.

Figure 8:
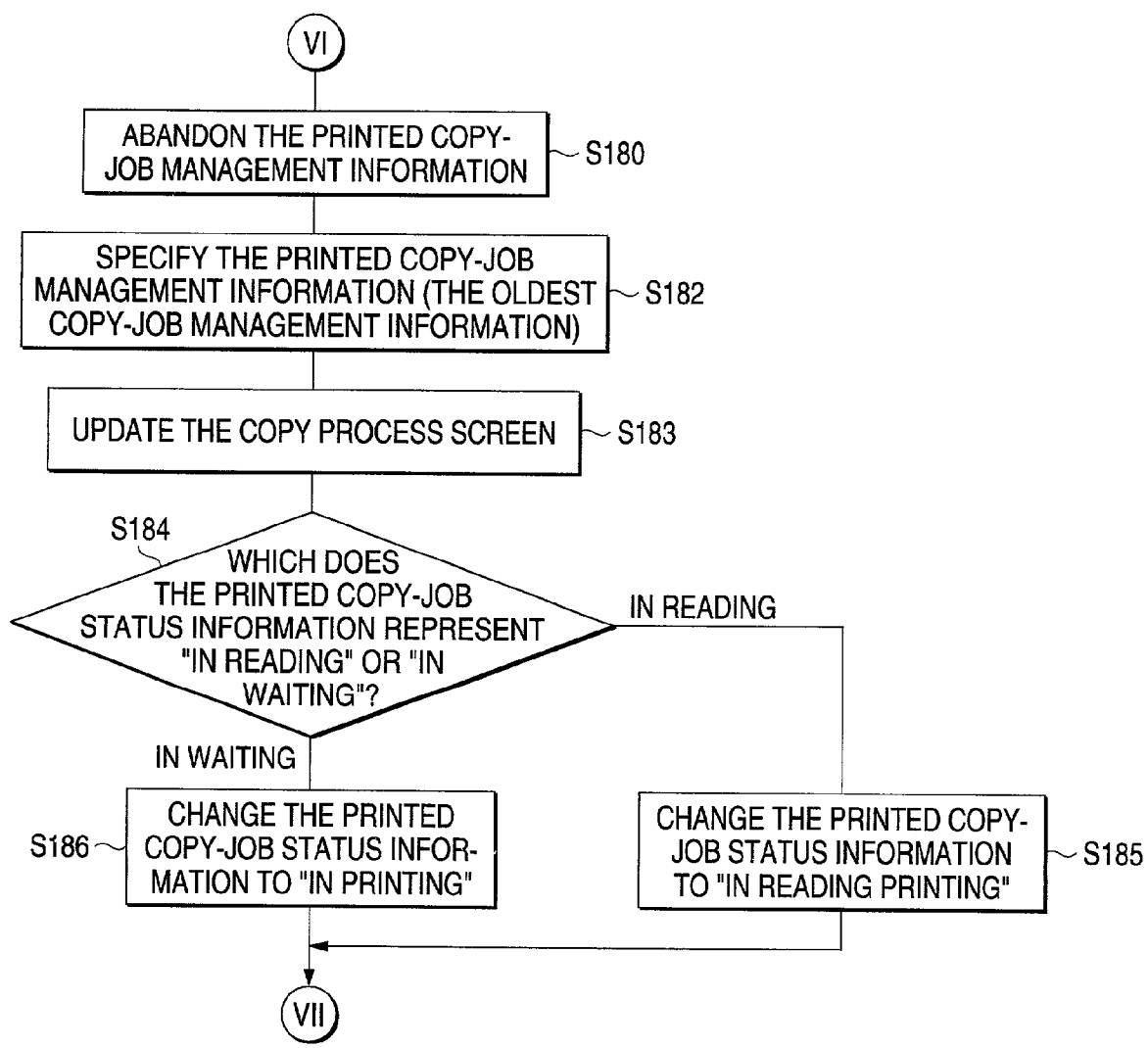
FIG. 8 is a flow chart showing the process executed in the main body.

When the printing control process on the copy job A is completed at a time point t3 before the reading control process on the copy job B is completed, the step 132 is branched to the "YES" side. The process shown in FIG. 8 is started to specify the copy-job management information on a copy job to be subjected to the printing control process in the step S182. In this case, the copy-job management information regarding the copy job B (the copy-job management information whose copy-job status information represents "In reading") is specified as the print copy-job management information. Since the copy-job status information represents "In reading", the copy-job status information B is changed to "In reading and printing".

And the process starting from the step S133 in FIG. 4 is continued. Since the printed printing-section status information represents "Not yet started" at this time point, the step S121 is branched to the "Not yet started" side after the steps S133 to S135 are executed, and control commands are supplied to the processed printing section 14. Thereafter, the reading control process and the printing control process, which are executed for the copy job B, are concurrently executed by repeating the execution of the steps S130 to S134 (FIG. 14; t3 to t4).

The reading control process on the copy job B is completed at a time point t4. At the subsequent time point t5, the execution of a copy job C is instructed. Then, the copy job C will undergo the same process as at the start of processing the copy job B.

When the reading control process on the copy job C is finished before the printing control process on the copy job B is finished, the step S136 is branched to the "NO" side in FIG. 4. In this case, the process shown in FIG. 5 is executed. Since the copy-job status information C as the read copy-job status information represents "In reading", the copy-job status information C is changed to "In waiting". And by the process shown in FIG. 6, the printing control process on the copy job B is continued (t6 to t7 in FIG. 14). When the printing control process is completed (step S157; YES), the process shown in FIG. 7 is executed to change the copy-job status information C to "In printing". The printing control process on the copy job C is carried out under the FIG. 6 process (t7 to t8 in FIG. 14).

An operation of the machine when the stop button 123 is depressed will be described.

Figure 15:
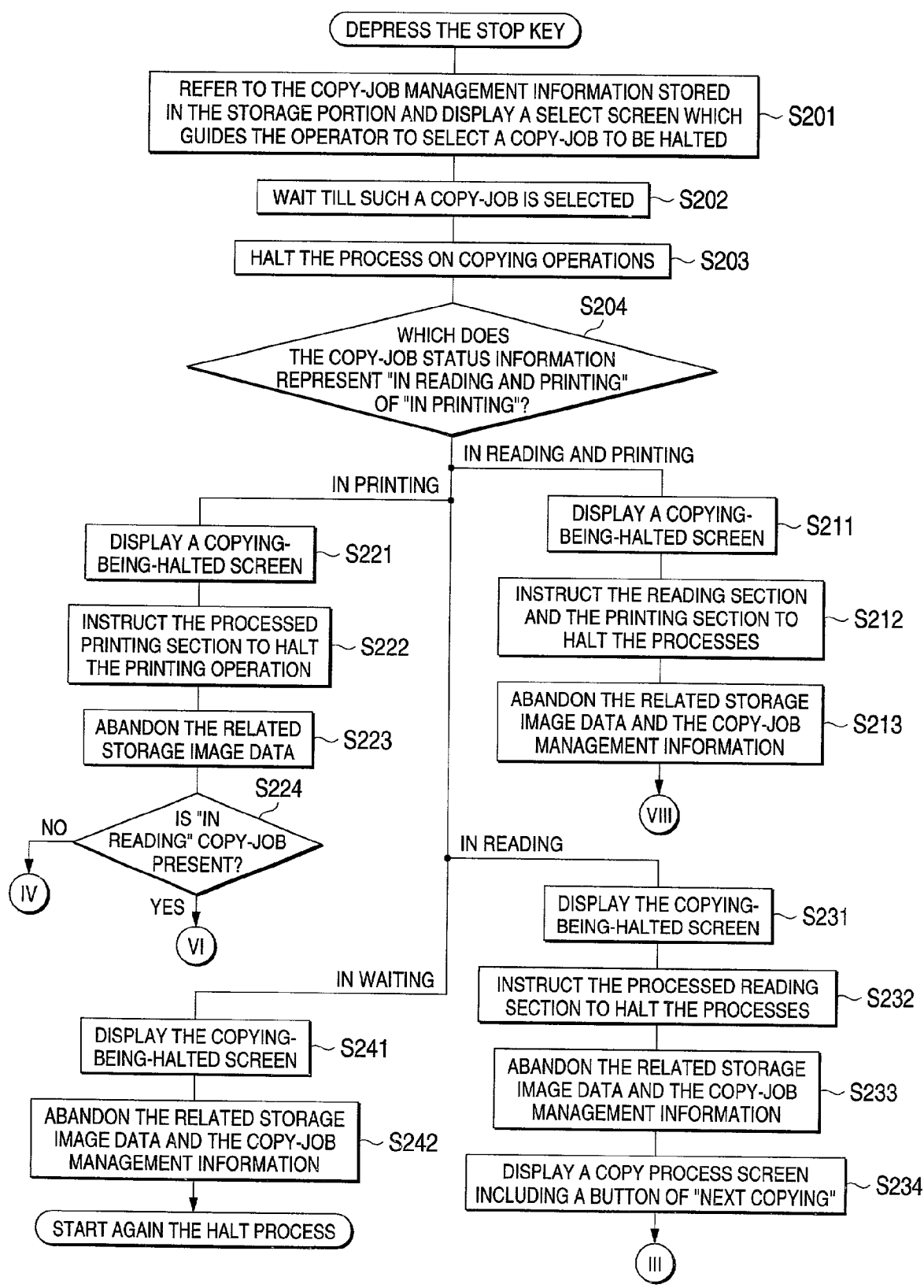
FIG. 15 is a flow chart showing an operation procedure of the main body of the copying-operation control device when a stop button is depressed.

When the stop button 123 is depressed, the CPU 21 refers to the copy-job management information stored in the storage portion 31 and causes the touch screen 121 to display a select screen which guides the operator to select a copy job to be halted (step S201) (FIG. 15). Then, the CPU 21 waits till the operator selects the copy job (step S202). These steps S201 and S202 are executed concurrently with the process shown in FIGS. 3 to 8. When the copy job is completed, the CPU rewrites the contents of the select screen to another.

When the copy job is selected, the CPU halts the process on coping operations, which is being executed (step S203), and starts a process based on the copy-job status information on the selected copy job as follows.

Figure 16:
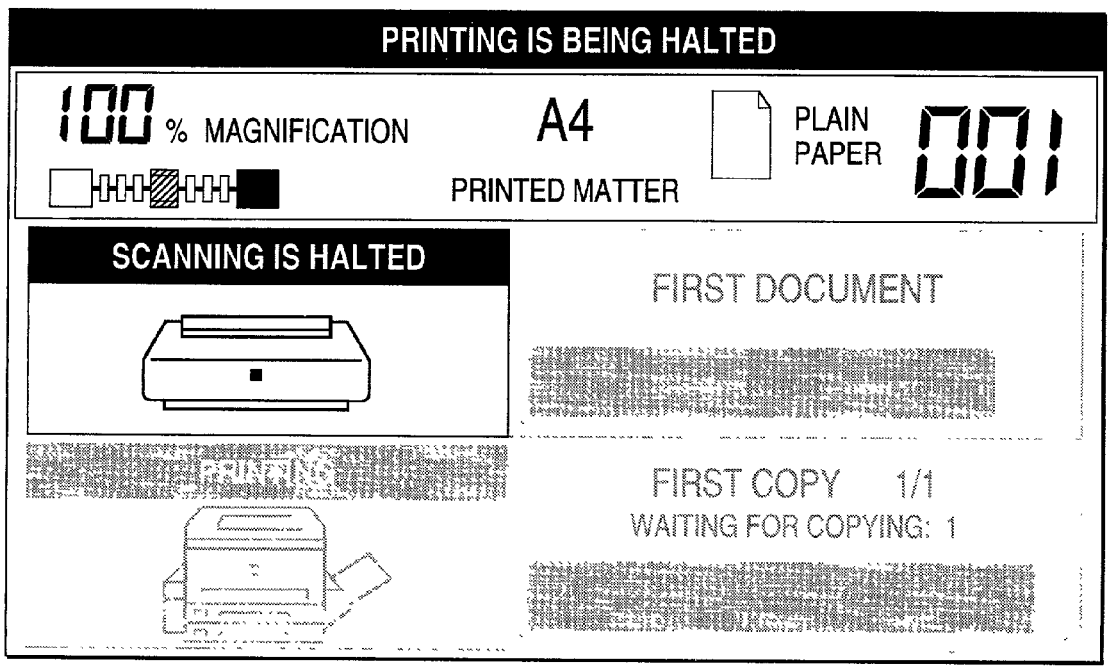
FIG. 16 is a diagram showing a copying-being-halted screen presented by the operating device when the FIG. 15 process is executed.

When the copy-job status information on the selected copy job represents "In reading and printing" (step S204; in reading and printing), the CPU 21 causes the touch screen 121 to display a copying-being-halted screen (step S211). The copying-being-halted screen displayed in this step is as shown in FIG. 16.

Then, the CPU 21 instructs the reading section 13 and the printing section 14 to halt the processes (step S212). Thereafter, the CPU 21 abandons the storage image data (in some cases, it is not stored) on the copy job instructed to be halted and the copy-job management information (step S213), and starts the process from the step S102 (FIG. 3).

Figure 17:
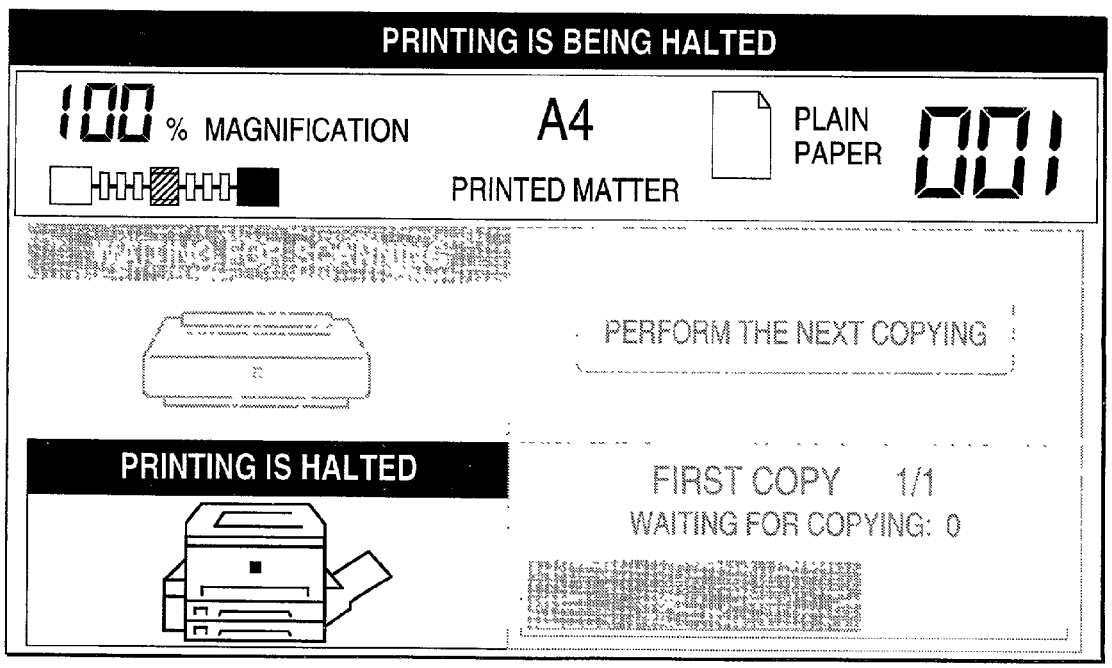
FIG. 17 is a diagram showing another copying-being-halted screen presented by the operating device when the FIG. 15 process is executed.
Figure 18:
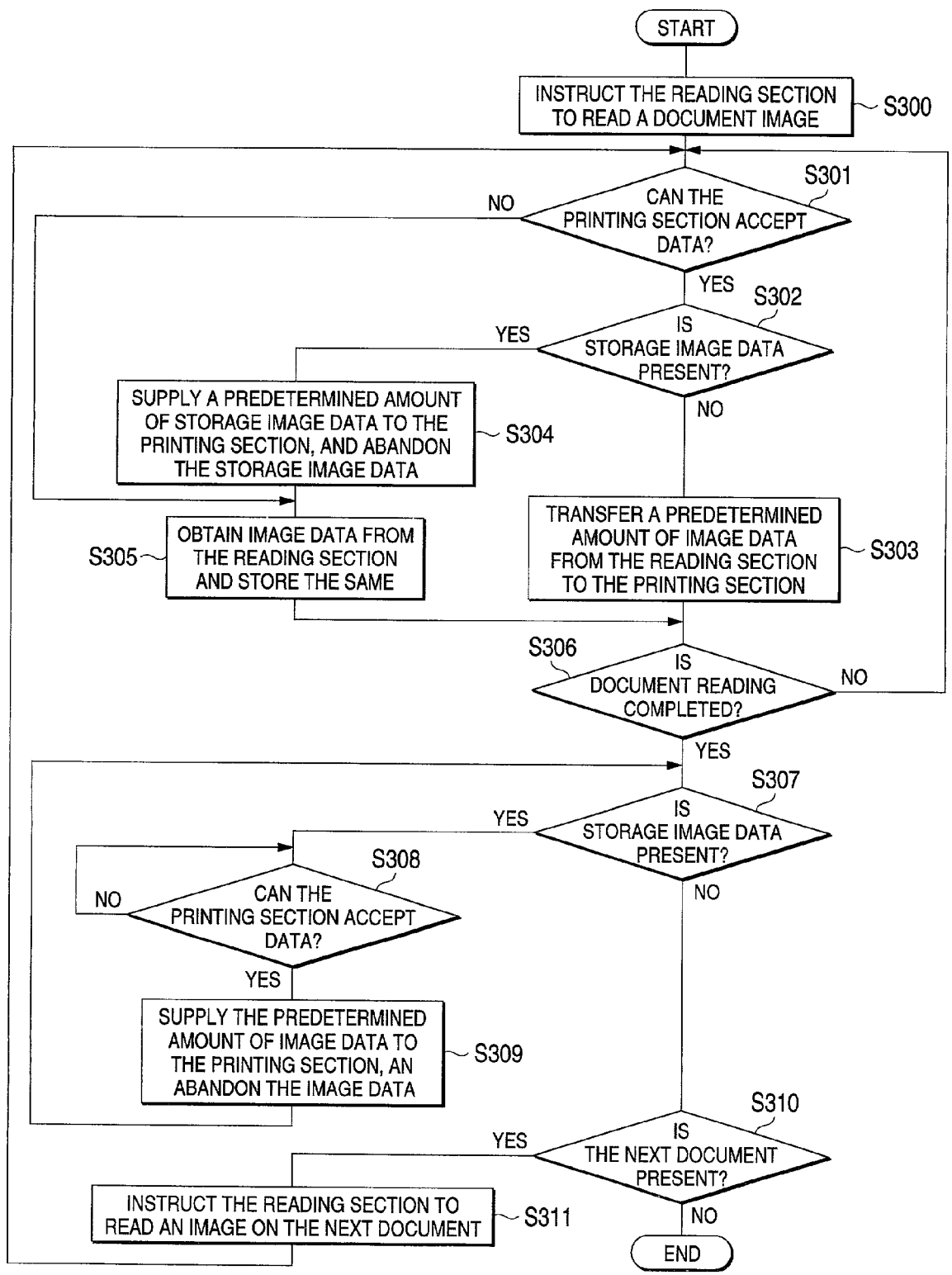
FIG. 18 is a flow chart showing an operation procedure executed under control of a control section in a general copying machine.

When the copy-job status information on the selected copy job represents "In printing" (step S204; in printing), that is, a copy job to be printed is selected, the CPU 21 causes the touch screen 121 to display a screen showing that the copying operation is halted (step S221). This screen is as shown in FIG. 17.

Subsequently, the CPU 21 instructs the processed printing section 14 to halt the printing operation (step S222). Then, the CPU 21 abandons (deletes) the storage image data on the copy job instructed to be halted (step S223). When the "In reading" copy job (the copy-job status information represents "In reading") is present (step S224; YES), the CPU proceeds to the step S180 in FIG. 8, abandons the printed copy-job management information, and executes the prescribed processes. When the "In reading" copy job is not present (step S224; NO), the CPU proceeds to the step S170 in FIG. 7, abandons the printed copy-job management information, and executes the prescribed processes.

That is, a process to be executed after the storage image data on the "In printing" copy job and the copy-job management information are abandoned (deleted) is the same as when the "Inprinting" copy job is normally completed (steps S132, S157). For executing the same process as the "In printing" copy job is normally completed, the step S224 is branched depending on whether or not the "In reading" copy job is present.

When the copy-job status information on the selected copy job represent "In reading" (step S204; in reading), the CPU causes the touch screen 121 to display the copying-being-halted screen (step S231). This screen presented in this step is similar to that presented in the step S211 (FIG. 16).

Then, the CPU 21 instructs the processed reading section 13 to halt the process execution (step S232). Thereafter, the CPU 21 abandons the storage image data on the copy job instructed to be halted and the copy-job management information (step S233). The CPU 21 causes the touch screen 121 to display the copy process screen including a button of "next copying" (step S234). In this case, since the "In printing" copy job is present, the CPU starts the process starting from the step S150 (FIG. 6) to continue the printing control process on the "In printing" copy job.

When the copy-job status information on the copy job instructed to be halted represents "In waiting" (step S204; in waiting), the CPU causes the touch screen 121 to display the copying-being-halted screen (step S241). This screen displayed in this step is similarly to the screen displayed in the step S221 (FIG. 17). And the CPU abandons the storage image data on the copy job instructed to be halted and the copy-job management information (step S242), and executes again the process interrupted.

As described above, the copying machine 10 is arranged such that a process to generate image data from an original document to complete a copy job and a process to cause the printing section 14 to print (output the copy result) based on the image data are independently and concurrently carried out. When the reading section 13 is not in a reading operation, it accepts an instruction to start the execution of the copy job. Accordingly, before the copy result of one sheet (or plural sheets) is output from the printing section 14, the next original document may be set to the machine and an instruction to start the copy job maybe issued (the start button 122 is depressed). As a result, the copying machine 10 reduces a time for the operator to be consumed for the copying work requiring the resetting of the document, and a time for the operator to wait till the machine is ready for the copying operation.

It is should be understood that the copying machine 10 of the embodiment may be modified variously. The scanner and the printer coupled to the copying machine 10 are commercially available; however, those may be designed exclusively for the copying machine 10. In the copying machine 10, the amount of image data obtained at a time from the reading section 13 is equal to the amount of image data supplied at a time to the printing section 14 (more properly, the image data amount which is the base for the data supplied to the printing section 14). It is evident that both the data amounts, a frequency at which the image data is obtained from the reading section 13, a frequency at which the data is supplied to the printing section 14, and the like may be selected to be those different from those in the copying machine 10.

In the copying machine 10 of the embodiment, when the reading section 13 is operating, it is impossible to set (alter) copying conditions. If required, it may be modified such that even when the reading section 13 is operating, the copying conditions may be set (the depression of the start button 122 is neglected).

In the above-mentioned embodiment, the copying-operation control device 15 are used for controlling the operations of the scanner and the printer. A general computer system (including an input/output device and a computer main frame) may be used instead. In this case, a computer mouse and a key board are required for setting copying conditions. To avoid this, it is preferable to use the above-mentioned arrangement (the operating device 12 designed exclusively for the machine is used for the input/output device).

As seen from the foregoing description, in the copying machine of the invention, a time for a user to wait till a copying process being executed in response to an instruction by another user or the user himself ends, is shorter than in the conventional copying machine. Further, a system equivalent to the copying machine of the invention may be constructed by using a scanner and a printer. Additionally, the computer readable recording medium enables a computer to operate as the copying-operation control device of the invention.

What is claimed is:

1. A copying machine comprising:
   a reading unit which reads an image on an original document and outputs image data representing the image;
   a printing unit which receives printing data and prints according to the printing data;
   a data storing unit which stores the image data output from the reading unit;
   a start-command accepting unit which accepts a start command for starting a copy job when the reading unit is not in a reading operation;
   a reading-operation control unit which executes such controls that when the start-command accepting unit accepts the start-command of the copy job, the reading-operation control unit causes the reading unit to start the reading operation of reading the image on the original document set to the reading unit and the reading-operation control unit stores the image data output from the reading unit into the data storing unit whether the printing unit is operating or not;

a printing-operation control unit which supplies the printing data based on the image data stored in the data storing unit to the printing unit;

a display; and a display control unit which executes such controls that the display control unit causes the display, for informing a user, to display a state of the process executed by the reading unit and a state of the process executed by the printing unit during the operation of the reading-operation control unit and the printing-operation control unit, and the display control unit causes the display, for informing a user, to display a state that the start-command accepting unit can accept the start command of the copy job and the state of the process executed by the printing unit when the reading-operation control unit is not in operation and the printing-operation control unit is in operation.

2. A copying machine according to claim 1 further comprising:

a managing unit which assigns copy job identifying information to each copy job of which a start command is obtained by the start-command accepting unit, and manages the correspondence between the image data stored in the data storing unit by the reading-operation control unit and the copy job identified by any of the copy job identifying information;

a halting-command accepting unit which accepts a halt command for halting the copy job; and a copy-job halting control unit which executes such controls that the copy-job halting control unit deletes from the data storing unit the image data which is managed by the managing unit and corresponds to the copy job identifying information of the copy job of which the halt command is accepted by the halting-command accepting unit, when the reading-operation control unit carries out a process on the copy job, the copy-job halting control unit causes the reading-operation control unit to halt the execution of the process, and when the printing-operation control unit executes a process on the copy job, the copy-job halting control unit causes the printing-operation control unit to halt the execution of the process.

3. A copying-operation control device connectable to a scanner and a printer, comprising:

a data storing unit which stores image data output from the scanner;

a start-command accepting unit which accepts a start command for starting a copy job when the scanner is not in a reading operation;

a reading-operation control unit which executes such controls that when the start-command accepting unit accepts the start-command, the reading-operation control unit causes the scanner to start the reading operation of reading an image on an original document set to the scanner whether the printer is operating or not, and the reading-operation control unit stores the image data output from the scanner into the data storing unit;

a printing-operation control unit which supplies a print data element based on at least one of the image data stored in the data storing unit to the printer; and a display control unit which executes such controls that the display control unit causes a display, for informing a user, to display a state of the process executed by the reading unit and a state of the process executed by the printing unit during the operation of the reading-operation control unit and the printing-operation control unit, and the display control unit causes the display, for informing the user, to display a state that the start-command accepting unit can accept the start command of the copy job and the state of the process executed by the printing unit when the reading-operation control unit is not in operation and the printing-operation control unit is in operation.

4. A copying-operation control device connectable to at least one scanner and at least one printer, the copying-operation control device comprising:

a copy job management information storing unit which includes a memory capacity capable of storing plural pieces of copy job management information including scanner identifying information and printer identifying information;

a data storing unit which stores image data output from one of the at least one scanner;

a start command accepting unit which accepts a start command for starting a copy job representing that which scanner being not in operation of the at least one scanner is designated as an image data source and which printer of the at least one printer is designated as a copy data destination;

a copy-job management information forming unit which executes such controls that when the start-command accepting unit accepts the start command for the copy job, the copy-job management information forming unit forms the copy-job management information including the scanner identifying information of the scanner designated as the image data source on the copy job and printer identifying information of the printer designated as the copy data destination on the copy job, and stores the copy-job management information into the copy job management information storing unit;

a reading-operation control unit which executes such controls that when the copy-job management information is formed by the copy-job management information forming unit, the reading-operation control unit causes the scanner identified by scanner identifying information contained in the copy-job management information to start an operation of reading an image on an original document set on the scanner, and the reading-operation control unit associates the image data which the scanner outputs as the result of the reading operation with the copy-job management information and stores the image data into the data storing unit whether or not a printer identified by printer identifying information contained in the copy-job management information is in operation;

a printing-operation control which supplies print data based on the image data, stored in the data storing unit in association with the copy-job management information earliest stored in the copy-job management information storing unit, to the printer identified by printer identifying information contained in the copy-job management information; and a management deleting unit which deletes the copy-job management information earliest stored in the copy-job management information storing unit when the operation of the reading-operation control unit, which is started when the copy-job management information is formed, ends, and the sending of the print data based on the image data associated with the copy-job management information to the printer is completed.

5. The copying machine according to claim 1, wherein the copying machine is constituted by a scanner which functions as the reading unit, a printer which functions as the printing unit, and a copying-operation control device which functions as the data storing unit, the start-command accepting unit, the reading-operation control unit, a printing-operation control unit and the display control unit.

6. A computer program embodied in a computer-readable medium including instructions, wherein the instructions, when executed by a computer connected to a scanner and a printer, causes the computer to function as:

a data storing unit that stores image data output from the scanner;

a start-command accepting unit that accepts a start command for starting a copy job when the reading unit is not in a reading operation;

a reading-operation control unit which executes such controls that when the start-command accepting unit accepts the start-command of the copy job, the reading-operation control unit causes the reading unit to start the reading operation of reading the image on the original document set to the reading unit and the reading-operation control unit stores the image data output from the reading unit into the data storing unit whether the printing unit is operating or not;

a printing-operation control unit which supplies the printing data based on the image data stored in the data storing unit to the printing unit;

a display; and a display control unit which executes such controls that the display control unit causes the display, for informing a user, to display a state of the process executed by the reading unit and a state of the process executed by the printing unit during the operation of the reading-operation control unit and the printing-operation control unit, and the display control unit causes the display, for informing a user, to display a state that the start-command accepting unit can accept the start command of the copy job and the state of the process executed by the printing unit when the reading-operation control unit is not in operation and the printing-operation control unit is in operation.

* * * * *